United States Patent
Zaydel et al.

(10) Patent No.: US 12,139,215 B1
(45) Date of Patent: Nov. 12, 2024

(54) METHOD FOR DETECTION AND MITIGATION OF BLOCKED STEERING ACTUATOR

(71) Applicant: Waymo LLC, Mountain View, CA (US)

(72) Inventors: Justin Zaydel, Mountain View, CA (US); Diomidis Katzourakis, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 355 days.

(21) Appl. No.: 17/573,128

(22) Filed: Jan. 11, 2022

(51) Int. Cl.
B62D 5/04 (2006.01)

(52) U.S. Cl.
CPC ......... B62D 5/0496 (2013.01); B62D 5/0481 (2013.01)

(58) Field of Classification Search
CPC .......................... B62D 5/0496; B62D 5/0481
See application file for complete search history.

(56) References Cited

U.S. PATENT DOCUMENTS

| | | | |
|---|---|---|---|
| 4,934,473 A * | 6/1990 | Fushimi | B62D 5/0481 180/404 |
| 5,202,830 A * | 4/1993 | Tsurumiya | B62D 5/0481 701/41 |
| 5,908,457 A * | 6/1999 | Higashira | B62D 6/008 701/41 |
| 6,032,752 A * | 3/2000 | Karpik | B60G 15/06 180/193 |

(Continued)

FOREIGN PATENT DOCUMENTS

| | | | | |
|---|---|---|---|---|
| CN | 102687386 A | * | 9/2012 | ............ B62D 5/046 |
| CN | 107735310 B | * | 12/2019 | ............ B62D 5/046 |

(Continued)

OTHER PUBLICATIONS

"Fault Diagnosis Strategy of Autonomous Steering System for Intelligent Vehicle Based on State Estimation;" He et al., 2022 6th CAA International Conference on Vehicular Control and Intelligence (CVCI) (pp. 1-6); Oct. 28, 2022. (Year: 2022).*

(Continued)

*Primary Examiner* — Stephen Holwerda
*Assistant Examiner* — Jorge O Peche
(74) *Attorney, Agent, or Firm* — Botos Churchill IP Law

(57) ABSTRACT

Aspects of the technology involve controlling a vehicle configured to operate in an autonomous driving mode. This includes receiving a set of environmental inputs including temperature information from different temperature sources, receiving initial steering information from a steering system of the vehicle, and obtaining an initial rack position command by a motion control module of the vehicle. The system determines, based on the environmental inputs, the initial steering information and an initial rack position, a likelihood that a steering actuator of the steering system of the vehicle is blocked or likely to become blocked. The system determines whether a threshold excitation amount has been applied to the steering system within a selected amount of time or a selected driving distance. When the threshold amount of excitation is not met, an excitation profile is applied to the steering system in order to modify the initial rack position.

15 Claims, 25 Drawing Sheets

(56) References Cited

U.S. PATENT DOCUMENTS

| | | | | |
|---|---|---|---|---|
| 6,065,561 | A * | 5/2000 | Howard | B62D 7/224 |
| | | | | 91/375 A |
| 6,079,513 | A * | 6/2000 | Nishizaki | B62D 15/0235 |
| | | | | 701/41 |
| 6,082,482 | A * | 7/2000 | Kato | B62D 6/008 |
| | | | | 701/41 |
| 6,237,706 | B1 | 5/2001 | Karpik et al. | |
| 6,272,947 | B1 * | 8/2001 | Howard | B62D 6/04 |
| | | | | 280/90 |
| 6,523,637 | B1 * | 2/2003 | Nakano | B62D 5/046 |
| | | | | 180/402 |
| 6,817,437 | B2 * | 11/2004 | Magnus | B62D 5/006 |
| | | | | 180/443 |
| 7,103,460 | B1 * | 9/2006 | Breed | G07C 5/008 |
| | | | | 706/15 |
| 7,604,088 | B2 * | 10/2009 | Nishizaki | B62D 6/10 |
| | | | | 180/444 |
| 8,881,861 | B2 * | 11/2014 | Tojo | F16K 15/148 |
| | | | | 180/444 |
| 9,227,656 | B2 * | 1/2016 | Tojo | B62D 5/0424 |
| 9,476,430 | B2 * | 10/2016 | Immendoerfer | F02D 41/062 |
| 10,351,162 | B1 * | 7/2019 | Katzourakis | B62D 5/001 |
| 10,471,983 | B2 | 11/2019 | Leutner et al. | |
| 10,746,151 | B2 * | 8/2020 | Chen | F02N 11/108 |
| 11,108,346 | B2 * | 8/2021 | Malchow | H02P 21/18 |
| 2002/0063015 | A1 * | 5/2002 | Sugitani | G05G 9/047 |
| | | | | 180/444 |
| 2002/0121132 | A1 * | 9/2002 | Breed | B60C 11/24 |
| | | | | 73/146 |
| 2003/0009270 | A1 * | 1/2003 | Breed | B60N 2/0276 |
| | | | | 701/32.4 |
| 2003/0125854 | A1 * | 7/2003 | Kawasaki | G07C 5/008 |
| | | | | 701/431 |
| 2004/0003954 | A1 * | 1/2004 | Sugitani | B62D 1/12 |
| | | | | 180/402 |
| 2004/0036601 | A1 * | 2/2004 | Obradovich | B60C 23/20 |
| | | | | 340/425.5 |
| 2004/0130442 | A1 * | 7/2004 | Breed | G06V 20/593 |
| | | | | 340/449 |
| 2004/0163395 | A1 * | 8/2004 | Ichishi | B60H 1/00978 |
| | | | | 62/130 |
| 2004/0256171 | A1 * | 12/2004 | Sugitani | B62D 6/002 |
| | | | | 180/402 |
| 2005/0192727 | A1 * | 9/2005 | Shostak | G07C 5/008 |
| | | | | 701/1 |
| 2005/0273218 | A1 * | 12/2005 | Breed | G06K 7/10178 |
| | | | | 701/2 |
| 2006/0025897 | A1 * | 2/2006 | Shostak | G06K 19/0717 |
| | | | | 701/1 |
| 2007/0057781 | A1 * | 3/2007 | Breed | H01Q 1/3233 |
| | | | | 340/457.1 |
| 2007/0205041 | A1 * | 9/2007 | Nishizaki | B62D 5/0472 |
| | | | | 180/446 |
| 2010/0235065 | A1 * | 9/2010 | Logan | B60T 17/22 |
| | | | | 701/80 |
| 2010/0294455 | A1 * | 11/2010 | Yang | B60H 1/00428 |
| | | | | 62/235.1 |
| 2011/0094821 | A1 * | 4/2011 | Aoki | B62D 5/046 |
| | | | | 318/472 |
| 2011/0160964 | A1 * | 6/2011 | Obradovich | H04L 43/08 |
| | | | | 701/41 |
| 2012/0089299 | A1 * | 4/2012 | Breed | B60C 19/00 |
| | | | | 701/1 |
| 2012/0152645 | A1 * | 6/2012 | Matthias | B62D 5/04 |
| | | | | 180/442 |
| 2012/0239254 | A1 * | 9/2012 | Heilig | B62D 5/0481 |
| | | | | 701/41 |
| 2013/0253767 | A1 * | 9/2013 | Lee | B60W 50/04 |
| | | | | 701/41 |
| 2014/0222291 | A1 * | 8/2014 | Dornhege | B62D 6/10 |
| | | | | 701/41 |
| 2015/0167466 | A1 * | 6/2015 | Teodorescu | E21B 4/02 |
| | | | | 73/152.01 |
| 2016/0362130 | A1 * | 12/2016 | Hwa | B62D 5/0421 |
| 2019/0023313 | A1 * | 1/2019 | Zuzelski | B62D 5/0481 |
| 2019/0294173 | A1 * | 9/2019 | Szubbocsev | B60W 60/0023 |
| 2020/0031196 | A1 * | 1/2020 | Chevers | B60H 1/00828 |
| 2020/0114952 | A1 * | 4/2020 | Mayer | B62D 5/0463 |
| 2020/0114959 | A1 * | 4/2020 | Varga | B60W 40/114 |
| 2020/0117181 | A1 | 4/2020 | Cella et al. | |
| 2020/0307674 | A1 * | 10/2020 | Morino | B62D 15/021 |
| 2021/0291619 | A1 * | 9/2021 | Aghniaey | B60H 1/00971 |
| 2022/0068053 | A1 * | 3/2022 | Hinduja | B60W 50/0205 |
| 2023/0158842 | A1 * | 5/2023 | Beaurepaire | G01C 21/3679 |
| | | | | 340/442 |

FOREIGN PATENT DOCUMENTS

| | | | | | |
|---|---|---|---|---|---|
| CN | 107618565 | B | * | 1/2020 | |
| CN | 111038577 | A | * | 4/2020 | B62D 3/04 |
| DE | 102007002972 | A1 | * | 9/2007 | B62D 5/0463 |
| DE | 102022200887 | A1 | * | 7/2022 | B62D 5/0406 |
| DE | 102015211840 | B4 | * | 1/2023 | B62D 5/0481 |
| FR | 2691185 | A1 | * | 11/1993 | E02F 9/123 |
| FR | 3006976 | A1 | * | 12/2014 | B62D 1/046 |
| JP | 2000085604 | A | | 3/2000 | |
| JP | 2010036806 | A | * | 2/2010 | |
| KR | 100854765 | B1 | * | 8/2008 | |
| KR | 20180094653 | A | * | 8/2018 | |
| KR | 102636047 | B1 | * | 2/2024 | |
| UA | 91474 | U | * | 7/2014 | |
| WO | WO-2005108187 | A1 | * | 11/2005 | B62D 5/0472 |
| WO | 2008116555 | A1 | | 10/2008 | |
| WO | WO-2011054692 | A1 | * | 5/2011 | |
| WO | WO-2017130648 | A1 | * | 8/2017 | B60Q 9/00 |

OTHER PUBLICATIONS

"A synthetic input approach to slip angle based steering control for autonomous vehicles;" Subosits et al., 2017 American Control Conference (ACC) (pp. 2297-2302); Aug. 4, 2017. (Year: 2017).*

"A Feedforward-Feedback Coordinated Control-based Actuator Error Compensation Strategy;" Zhang et al., 2023 7th CAA International Conference on Vehicular Control and Intelligence (CVCI) (pp. 1-6); Oct. 27, 2023. (Year: 2023).*

Bauer, M., et al., "Indirect in-situ determination of blocked forces", DAGA 2010, Berlin, pp. 149-150.

Lundsrom, Adam, "Verification of CEVT Steering System Specification", Lulea University of Technology, 2019, pp. 1-80.

Mathe, Zsolt, et al., "Electrical Machines Used in Electric Power Steering Applications", 2019 8th International Conference on Modern Power Systems (MPS), pp. 1-9.

Wurges, Mathias, "New Electrical Power Steering Systems", Encyclopedia of Automotive Engineering, 2014 Wiley & Sons, Ltd., pp. 1-16.

* cited by examiner

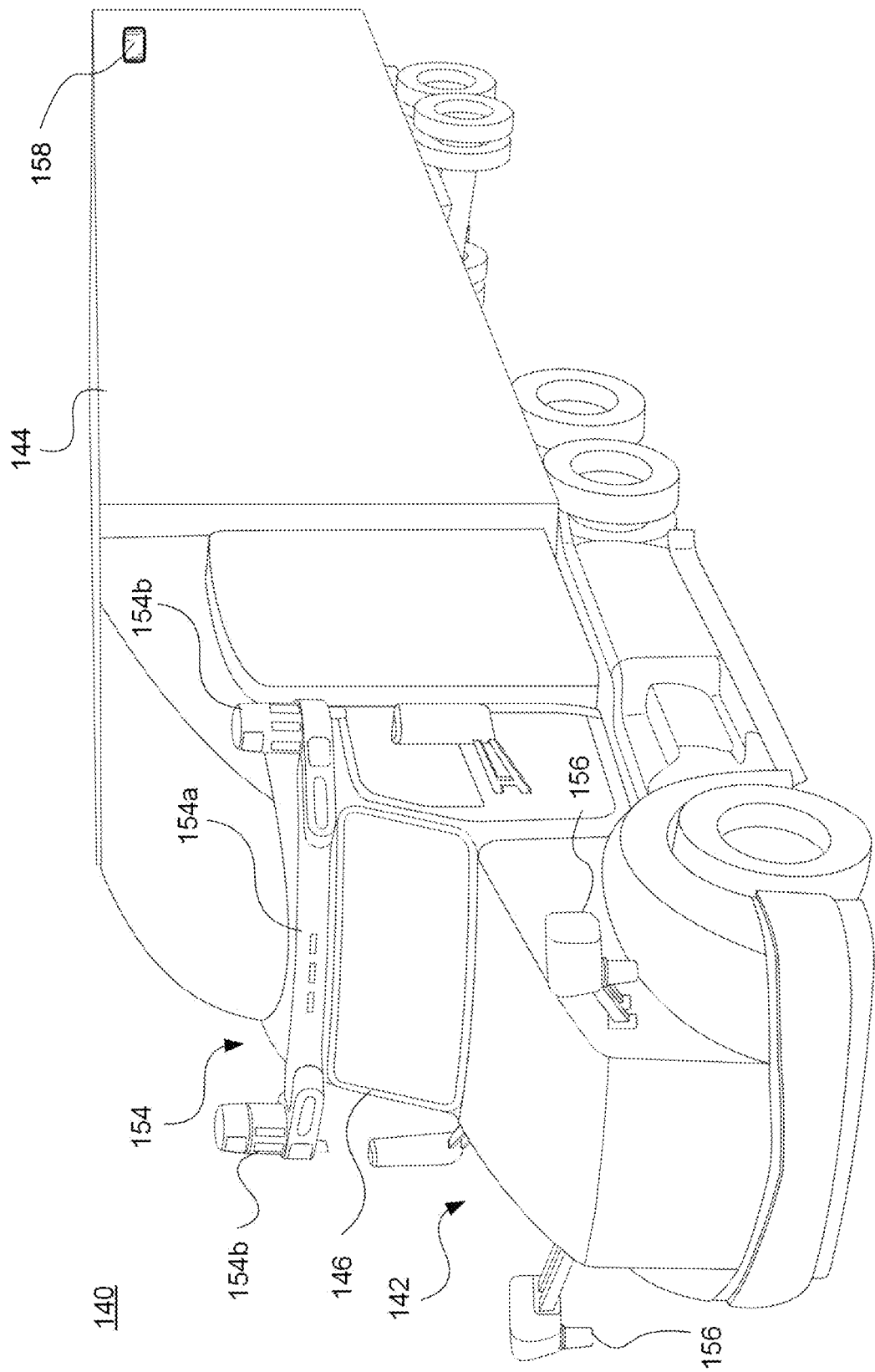

160

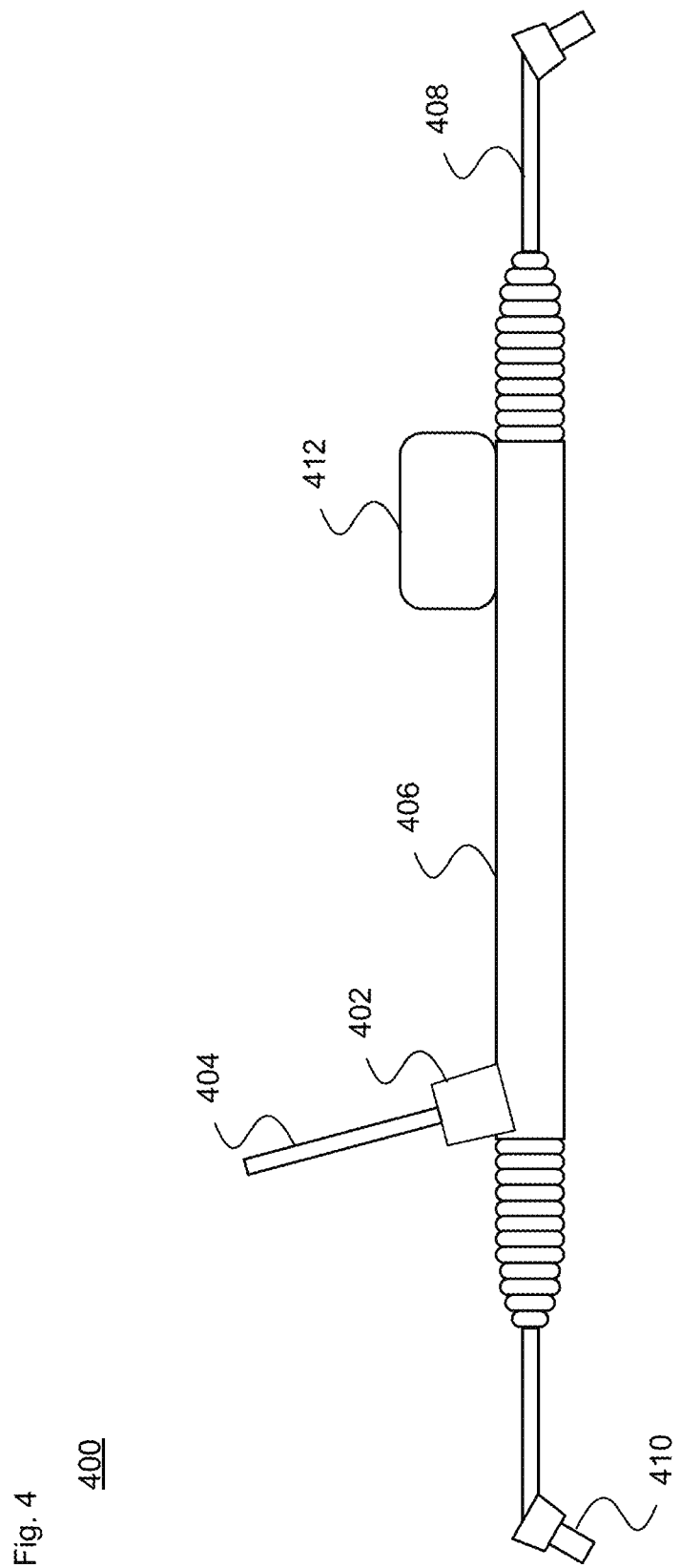

500

600

640

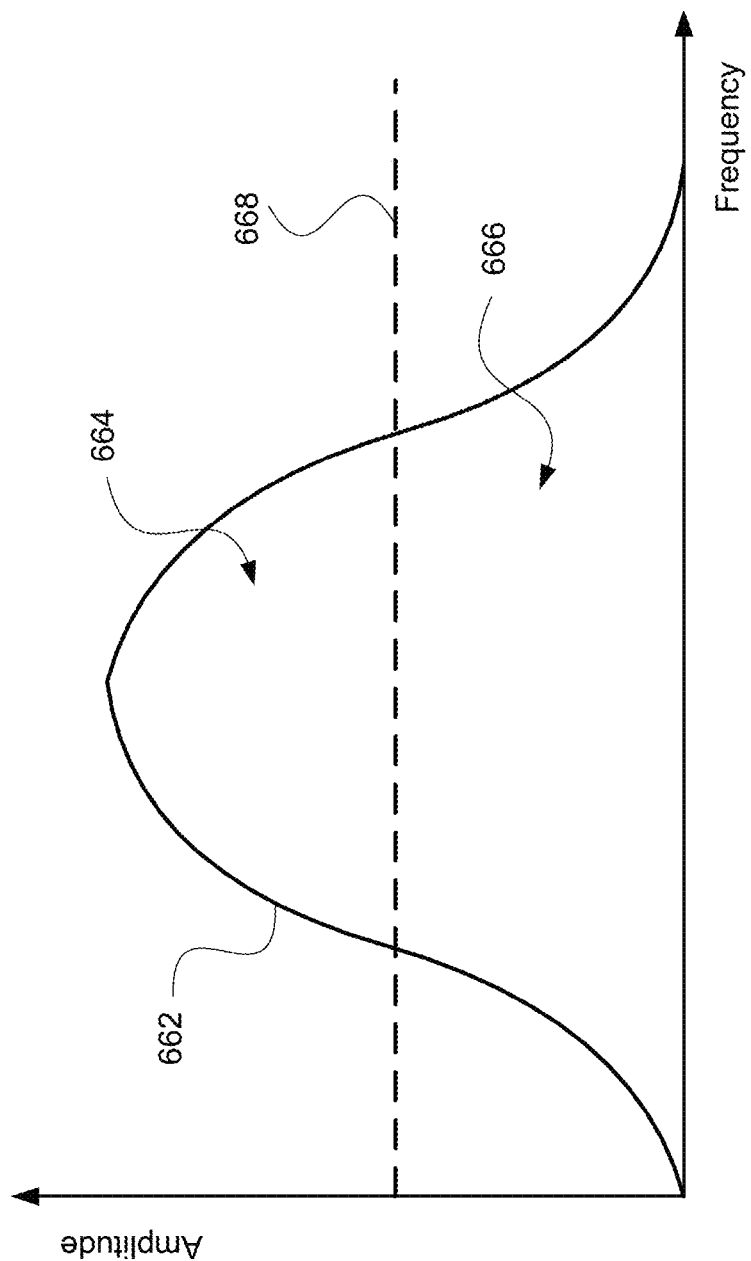

680

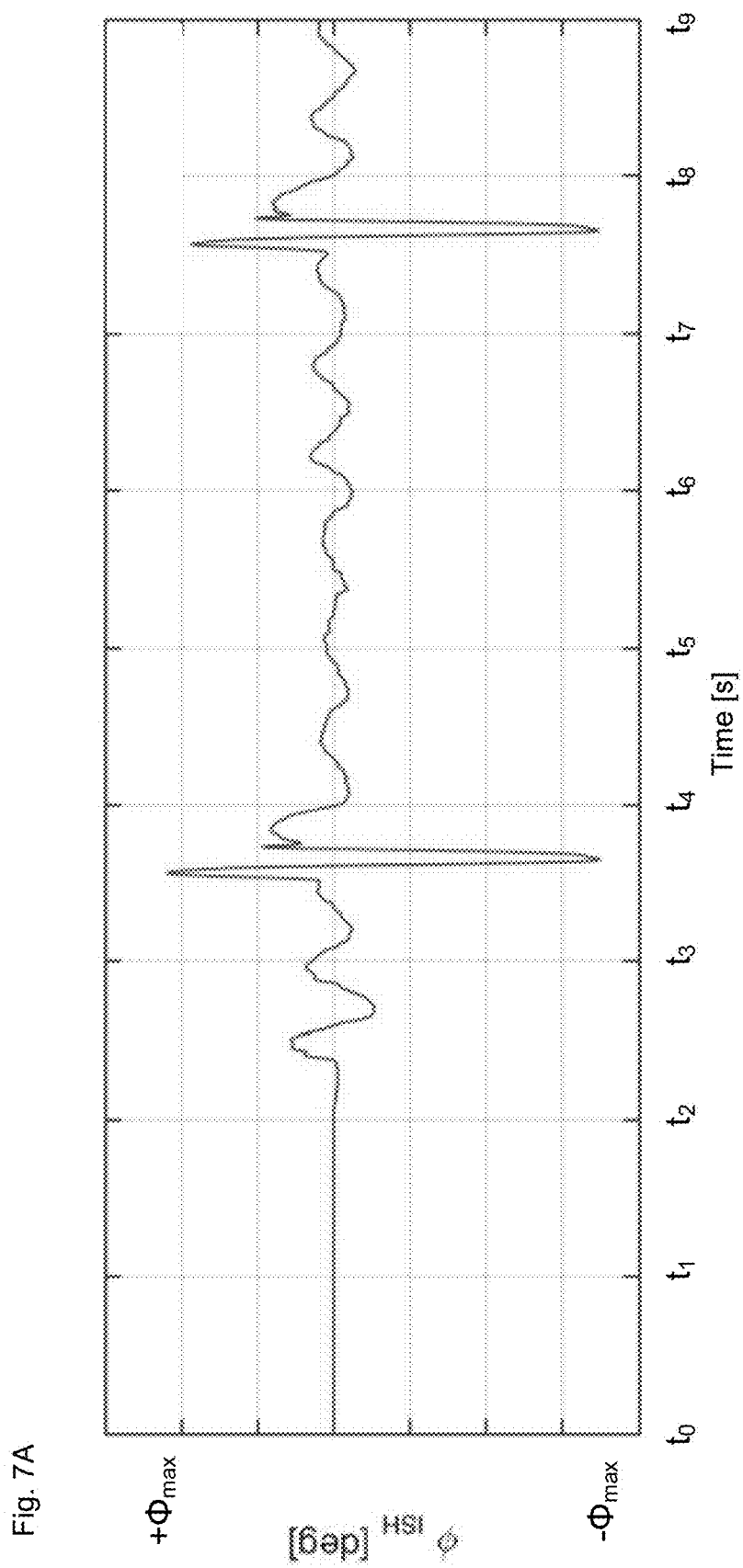

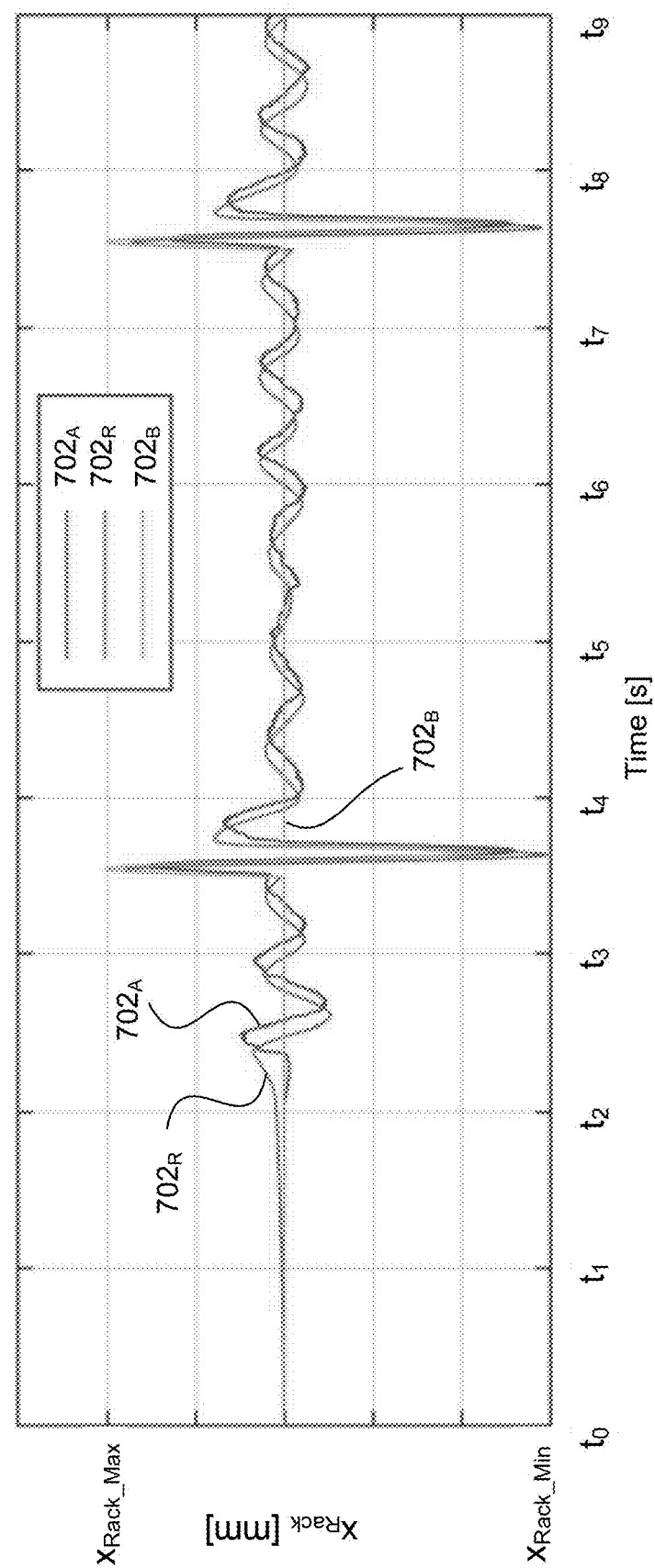

800

900

1000

METHOD FOR DETECTION AND MITIGATION OF BLOCKED STEERING ACTUATOR

BACKGROUND

Autonomous vehicles, for instance, vehicles that may not require a human driver in certain driving situations, can be used to aid in the transport of passengers or items from one location to another. Such vehicles may operate in a fully autonomous mode where passengers may provide some initial input, such as a pickup or destination location, and the vehicle maneuvers itself to that location. However, when driving in an autonomous mode, the vehicle may encounter a latent fault situation that can lead to a high friction condition such as a blocked steering actuator. Should this occur, the vehicle may not be able to adjust its driving trajectory due to degraded performance of the steering actuator or even a complete loss of steering function.

BRIEF SUMMARY

The technology relates to approaches for detecting and mitigating latent fault situations involving a blocked steering actuator for a vehicle. This is particularly beneficial for vehicles configured to drive in an autonomous mode where the vehicle is controlling the steering. One example of a latent fault situation is operation of the vehicle at cold ambient temperatures where water has entered the steering gear housing and begins to freeze. The frozen water can "block" the steering gear (actuator). However, the autonomous driving system of the vehicle may not be aware of this until a steering command is sent that involves a relatively large change in the steering angle. When the blocked steering actuator does not respond appropriately to the steering command, this would lead to a deviation from the planned vehicle trajectory.

In accordance with aspects of the technology, to provide sufficient movement of the steering system while driving under steady state conditions, the autonomous driving system is configured to detect that insufficient movement has occurred within a determined amount of time (e.g., the past 10-60 seconds of driving), and to command a specific movement profile with sufficient amplitude and frequency content for a subsequent amount of time (e.g., the next 2-30 seconds of driving). The specific movement profile is designed to ensure all diagnostics related to latent fault detection associated with the steering system are able to execute or otherwise complete, without introducing undue disturbance of the vehicle's position or adding discomfort to vehicle occupants. Alternatively or additionally, a heating element in the steering system (e.g., within or along the steering column or steering gear housing) may be activated by the autonomous driving system to reduce the likelihood of a high friction condition such as a blocked steering actuator from adversely affecting steering of the vehicle.

According to one aspect, a method for controlling a vehicle configured to operate in an autonomous driving mode is provided. The method comprises: receiving, by one or more processors of the vehicle, a set of environmental inputs, the set of environmental inputs including temperature information from different temperature sources; receiving, by the one or more processors, initial steering information from a steering system of the vehicle; obtaining, by the one or more processors, an initial rack position command by a motion control module of the vehicle; determining, by the one or more processors based on the received set of environmental inputs, the received initial steering information and an initial rack position associated with the initial rack position command, a likelihood that a steering actuator of the steering system of the vehicle is blocked or likely to become blocked while operating in the autonomous driving mode; upon determining that the likelihood exceeds a threshold likelihood, determining, by the one or more processors, whether a threshold amount of excitation has been applied to the steering system within a selected amount of time or a selected driving distance; and when the threshold amount of excitation has not been applied, causing, by the one or more processors, an excitation profile to be applied to the steering system in order to modify the initial rack position.

The method may further comprise: in response to modification of the initial rack position, repeating (i) determining the likelihood that the steering actuator is blocked or likely to become blocked, and (ii) determining whether the threshold amount of excitation has been applied within the selected amount of time; and causing another excitation profile to be applied to the steering system. Alternatively or additionally, receiving the set of environmental inputs including the temperature information from different temperature sources comprises receiving a set of temperature readings from different temperature sensors located at different parts of the vehicle. Here, receiving the set of environmental inputs including the temperature information from different temperature sources may further include receiving local weather information obtained from another vehicle or obtained from a weather database. The different temperature sensors may be a heterogenous set of sensors of different types. Determining the likelihood that the steering actuator of the steering system of the vehicle is blocked or likely to become blocked may include comparing the temperature readings from the different temperature sensors to identify either an average temperature or an estimated temperature along the steering actuator.

7 Alternatively or additionally, the received initial steering information may include at least one of a (i) current torque or a (ii) system effort versus rack position. Alternatively or additionally, the method may further comprise generating a future trajectory for the vehicle in response to a current trajectory that is based on the modified rack position. Alternatively or additionally, determining the likelihood that the steering actuator of the steering system of the vehicle is blocked or likely to become blocked may include identifying a blocked actuation pattern.

According to another aspect, a method for controlling a vehicle configured to operate in an autonomous driving mode is provided. The method comprises: generating, by a planner module of the vehicle, a trajectory for the vehicle to perform in the autonomous driving mode; decomposing, by a motion control module of the vehicle, the trajectory into a set of actuator commands; passing the set of actuator commands to one or more components of a driving system of the vehicle, the one or more components including a deceleration system, an acceleration system or a steering system; obtaining vehicle information according to a response by the vehicle to the set of actuator commands; obtaining environmental information associated with physical vehicle interactions between the vehicle and the vehicle's external environment;

identifying, by the motion control module, a blocked actuation pattern associated with the steering system; and in response to identifying the blocked actuation pattern, causing the steering system to apply an excitation profile in the autonomous driving mode in order to address a high friction condition in a steering actuator of the steering system.

The environmental information may include at least one of tire-road interaction, a wind disturbance, temperature, or road grade-banking. Alternatively or additionally, the high friction condition may be that the steering actuator is blocked or likely to become blocked while operating in the autonomous driving mode. Here, blockage of the steering actuator may be due to freezing water or ice in the steering actuator. Alternatively or additionally, the high friction condition may be a low level of lubricant or power steering fluid that is below a threshold operating level.

According to a further aspect, a vehicle is configured to operate in an autonomous driving mode. The vehicle comprises a sensor system, a driving system and a control system. The sensor system includes one or more sensors. The one or more sensors are configured to obtain sensor data associated with objects in an external environment of the vehicle. The driving system includes a steering system, an acceleration system and a deceleration system to control driving of the vehicle. The control system includes one or more processors. The control system is operatively coupled to the driving system and the sensor system. The control system is configured to: receive, from the sensor system a set of environmental inputs, the set of environmental inputs including temperature information from different temperature sources; receive initial steering information from the steering system; issue an initial rack position command to the steering system; determine, based on the received set of environmental inputs, the received initial steering information and an initial rack position associated with the initial rack position command, a likelihood that a steering actuator of the steering system of the vehicle is blocked or likely to become blocked while operating in the autonomous driving mode; upon determination that the likelihood exceeds a threshold likelihood, determine whether a threshold amount of excitation has been applied to the steering system within a selected amount of time or a selected driving distance; and when the threshold amount of excitation has not been applied within the selected amount of time, cause an excitation profile to be applied to the steering system in order to modify the initial rack position.

The determination of the likelihood that the steering actuator of the steering system of the vehicle is blocked or likely to become blocked may include the control system comparing temperature readings from different temperature sensors to identify either an average temperature or an estimated temperature along the steering actuator. Alternatively or additionally, the determination of the likelihood that the steering actuator of the steering system of the vehicle is blocked or likely to become blocked includes identification of a blocked actuation pattern. Here, identification of the blocked actuation pattern may be performed using a runtime diagnostic that observes a relationship between rotor speed and delivered motor torque for the driving system. Alternatively or additionally, the blocked actuation pattern may be a sticking movement pattern. Alternatively or additionally, the control system is configured to generate a future trajectory for the vehicle in response to a current trajectory that is based on the modified rack position.

BRIEF DESCRIPTION OF THE DRAWINGS

FIGS. 1C-E illustrate example cargo and delivery type vehicles configured for use with aspects of the technology.

FIG. 4 illustrates an example electronic power steering system associated with aspects of the technology.

FIGS. 6A-D illustrate aspects for detecting a blocked steering actuator in accordance with aspects of the technology.

FIGS. 7A-F illustrates various plots in accordance with aspects of the technology.

DETAILED DESCRIPTION

Figure 1A:
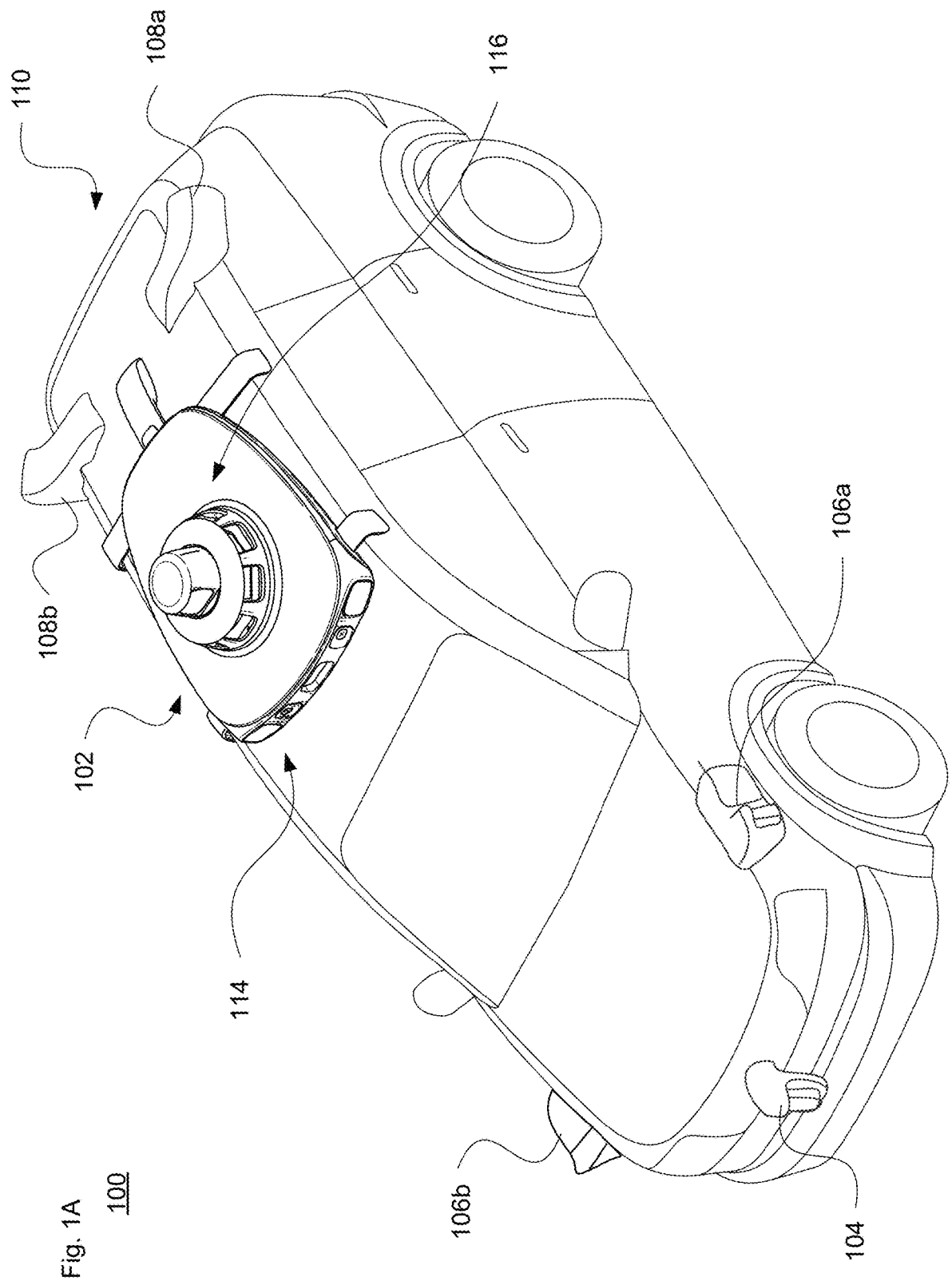
FIGS. 1A-B illustrate example self-driving (autonomous) vehicles in accordance with aspects of the technology.

Under certain situations, it is possible for water or other fluids or particulates to enter the steering gear assembly of a vehicle. For instance, in the case of water, depending on the location of the water in the assembly, the volume of water, and the ambient operating temperature, this can result in failure modes such as a complete loss of steering function (e.g., no power steering assistance) or, under cold ambient conditions, a blocked steering actuator. Similar issues can occur due to other fluids or particulates in the assembly.

In the case of water in the assembly, it is possible to mitigate these failure modes through either detection of water ingress or prevention of the water from freezing. In the former case, the system may employ a water sensor within an electric power steering (EPS) control module connector to detect water that has entered the connector cavity. Alternatively or additionally, the system may include a water sensor inside the EPS housing that detects whether water has penetrated the housing and its corresponding seals. In the latter case, the system may employ a runtime diagnostic that observes the relationship between EPS rotor speed and the delivered motor torque to detect distinct movement (actuation) patterns in rotor speed, which occur as water begins to freeze within the steering gear housing and causes blocking the steering actuator.

If water has entered the steering gear housing but has not been detected by the water sensor (e.g., due to a torn bellows on the steering gear housing), then it is possible for the water to freeze with low ambient temperature conditions (e.g., below 0° C.), resulting in a latent fault condition in which limited (e.g., less than 5-10 degrees of turning angle) or no steering movement is possible. This can occur when the vehicle is stationary for some period of time, or if the vehicle is driving in a straight line or other constant trajectory with little or no corrective input commands from the autonomous driving system. The runtime diagnostic may execute when the vehicle is in motion under specific conditions to detect the onset of water freezing before the actuator becomes completely blocked or too blocked to permit desired steering operation. Note that with completely frozen water, the EPS motor may lack sufficient torque authority to break or dislodge the formed ice. Even if a human driver were to take over steering control when disengaging from autonomous to manual mode, the driver may also lack sufficient torque ability to break or dislodge the formed ice, when using the handwheel (steering wheel).

Once the water begins to freeze, a change in commanded rack position that is of sufficient magnitude can initially cause a commanded vs. actual position deviation and increasing motor torque delivery. When the ice is dislodged or broken, the high motor torque can cause a rapid acceleration in the rack bar, as the actual rack bar position converges on the commanded position. If one or more of the aforementioned movement (actuation) patterns are detected within a specified time interval (e.g., between 30-120 seconds), the EPS may trigger a fault.

As a result of the frozen water fault trigger, the vehicle's control system may issue a signal independent of engaged mode, that can use a selected amount of the EPS motor torque capability (e.g., at least 10-25% of the motor torque capability, or more or less). This approach can prevent additional water from freezing within the steering gear. As noted above, a heating element may be employed to help prevent or mitigate such freezing. Once the fault is set, it may be stored in controller memory. In some instances, the steering gear may need to be replaced when this occurs, as water ingress can compromise the integrity of the steering gear.

In some instances, steering systems may be evaluated or otherwise tested in a cold ambient environment prior to series production on a final vehicle configuration. This may be helpful in situations where the vehicle configuration, including any software for the control systems, is set without any planned updates. However, in other situations where upgrades or other updates to the vehicle are likely, a more robust approach is beneficial because any physical test on a given vehicle and software configuration would not be valid once an update is performed. Thus, aspects of the technology employ a validation strategy that covers a broader parameter space. Here, validating within the parameter space also allows for separately auditing autonomous vehicle driving behaviors and identifying potential regressions in frozen water detection capability. Different solutions are possible, and are discussed in detail below.

Example Vehicle Systems

Figure 1B:
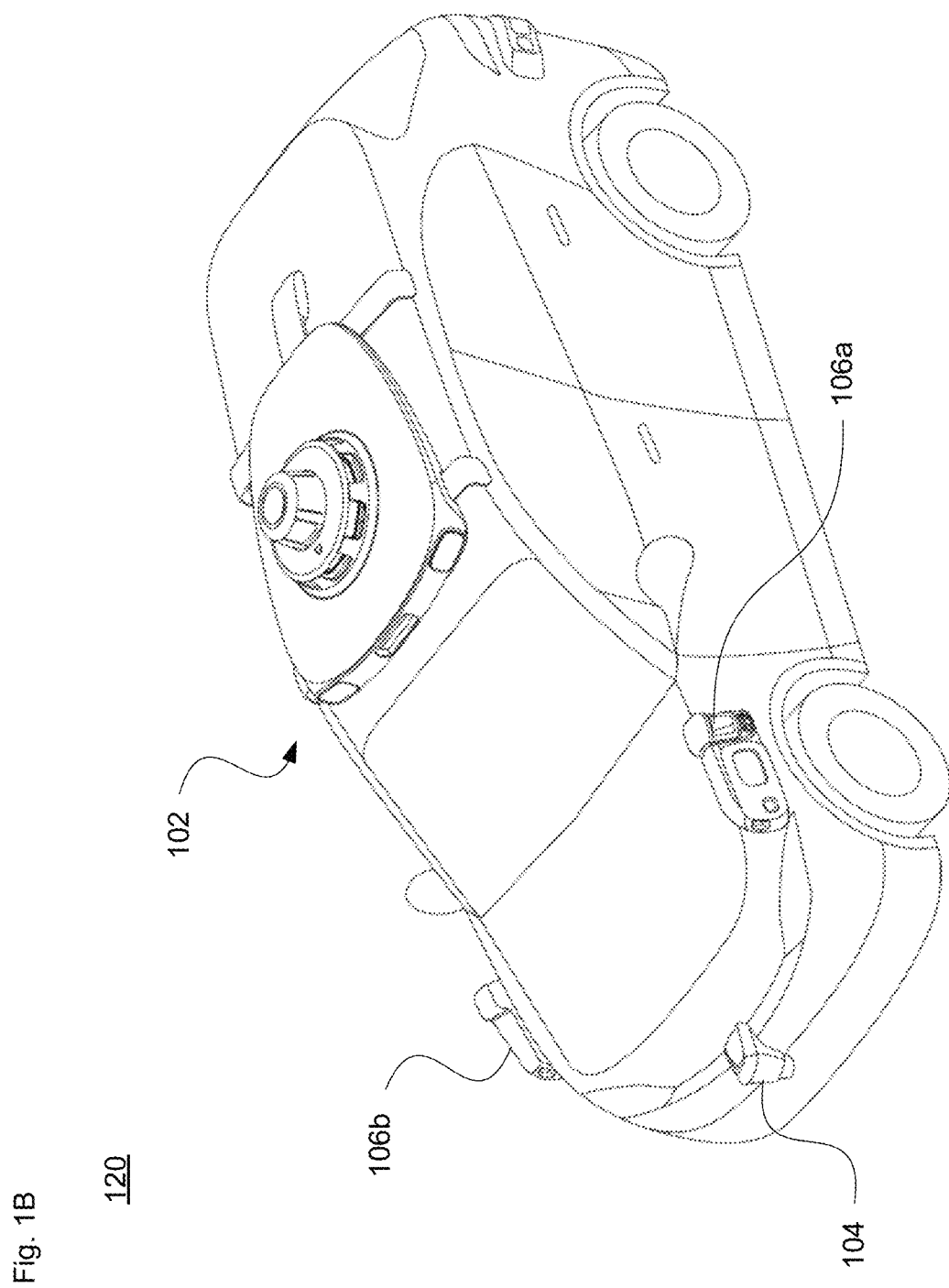
Figure 1D:
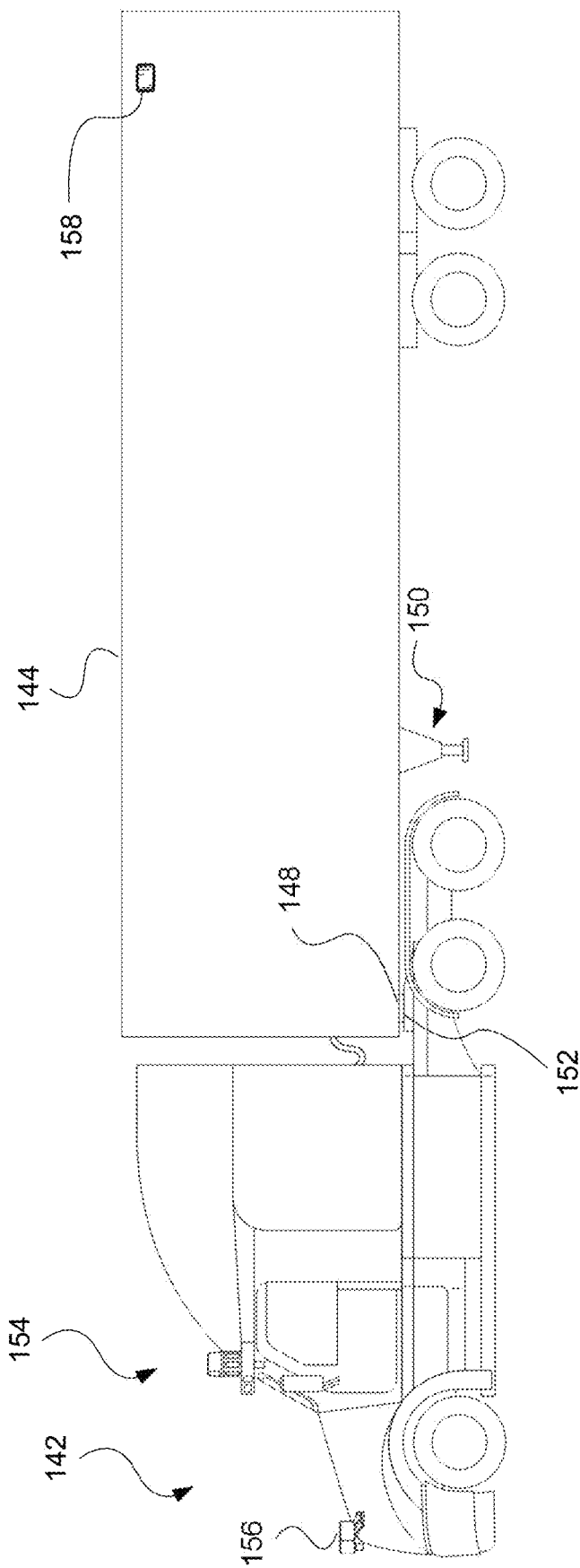
Figure 1E:
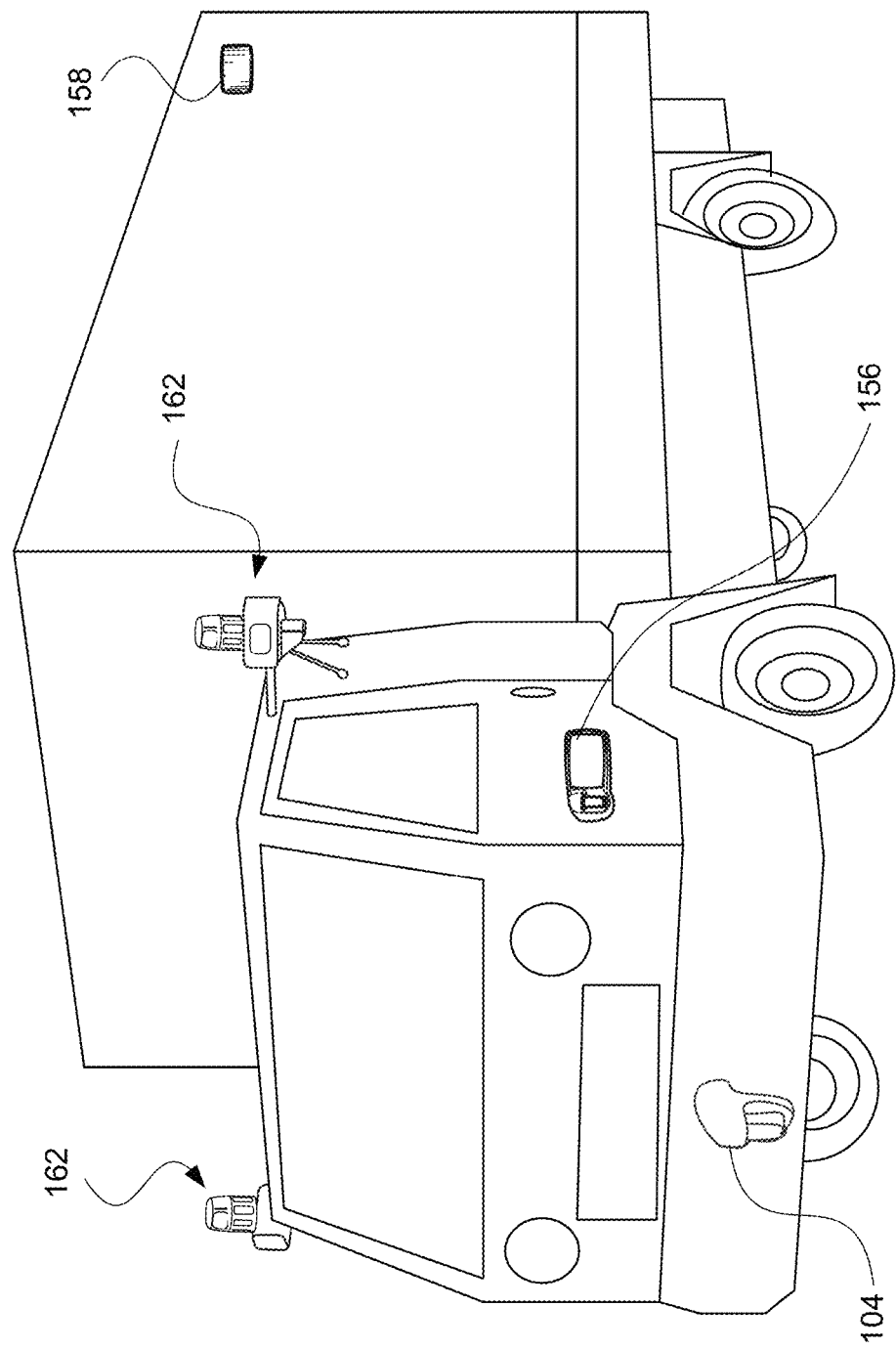

FIG. 1A illustrates a perspective view of an example passenger vehicle 100, such as a minivan or sport utility vehicle (SUV). FIG. 1B illustrates a perspective view of another example passenger vehicle 120, such as a sedan or crossover. The passenger vehicles may include various sensors for obtaining information about the vehicle's external environment. FIGS. 1C-D illustrate an example tractor-trailer type cargo vehicle 140. And FIG. 1E illustrates a smaller cargo vehicle 160, such as a panel truck for local deliveries.

Vehicles, such as those described herein, may be configured to operate in one or more different driving modes. For instance, in a manual driving mode, a driver may directly control acceleration, deceleration, and steering via inputs such as an accelerator pedal, a brake pedal, a steering wheel, etc. A vehicle may also operate in one or more autonomous driving modes including, for example, a semi or partially autonomous driving mode in which a person exercises some amount of direct or remote control over driving operations, or a fully autonomous driving mode in which the vehicle handles the driving operations without direct or remote control by a person. These vehicles may be known by different names including, for example, autonomously driven vehicles, self-driving vehicles, and so on.

The U.S. National Highway Traffic Safety Administration (NHTSA) and the Society of Automotive Engineers (SAE) have each identified autonomy different levels to indicate how much, or how little, a vehicle controls the driving, although different organizations may categorize the levels differently. Moreover, such classifications may change (e.g., be updated) overtime.

As described herein, in a semi or partially autonomous driving mode, even though the vehicle assists with one or more driving operations (e.g., steering, braking and/or accelerating to perform lane centering, adaptive cruise control or emergency braking), the human driver is expected to be situationally aware of the vehicle's surroundings and supervise the assisted driving operations. Here, even though the vehicle may perform all driving tasks in certain situations, the human driver is expected to be responsible for taking control as needed. In contrast, in a fully autonomous driving mode, the control system of the vehicle performs all driving tasks and monitors the driving environment. This may be limited to certain situations such as operating in a particular service region or under certain time or environmental restrictions, or may encompass driving under all conditions without limitation. In a fully autonomous driving mode, a person is not expected to take over control of any driving operation.

Unless indicated otherwise, the architectures, components, systems and methods described herein can function in a semi or partially autonomous driving mode, or a fully-autonomous driving mode. The technology may be employed in all manner of vehicles configured to operate in an autonomous driving mode, including vehicles that transport passengers or items such as food deliveries, packages, cargo, etc. While certain aspects of the disclosure are particularly useful in connection with specific types of vehicles, the vehicle may be any type of vehicle including, but not limited to, cars, vans, motorcycles, cargo vehicles, buses, recreational vehicles, emergency vehicles, etc.

For instance, as shown in FIG. 1A, the vehicle may include a roof-top housing unit (roof pod assembly) 102 may include one or more lidar sensors as well as various cameras (e.g., optical or infrared), radar units, acoustical sensors (e.g., microphone or sonar-type sensors, ultrasonic sensors, or the like), inertial (e.g., accelerometer, gyroscope, etc.) or other sensors (e.g., positioning sensors such as GPS sensors). Housing unit 102 may have any number of different configurations, such as domes, cylinders, "cake-top" shapes, etc. Housing 104, located at the front end of vehicle 100, and housings 106a, 106b on the driver's and passenger's sides of the vehicle may each incorporate lidar, radar, camera, acoustical and/or other sensors. For example, housing 106a may be located in front of the driver's side door along a quarter panel of the vehicle. As shown, the passenger vehicle 100 also includes housings 108a, 108b for, e.g., radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

In this example, arrow 114 indicates that the roof pod 102 as shown includes a base section coupled to the roof of the vehicle. And arrow 116 indicated that the roof pod 102 also includes an upper section (e.g., with the dome, cylinder or cake-top shape) raised above the base section. Each of the base section and upper section may house different sensor units configured to obtain information about objects and conditions in the environment around the vehicle. The roof pod 102 and other sensor housings may also be disposed along vehicle 120 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

The example cargo vehicle 140 of FIGS. 1C-D is a tractor-trailer truck. The truck may include, e.g., a single, double or triple trailer, or may be another medium or heavy-duty truck such as in commercial weight classes 4 through 8. As shown, the truck includes a tractor unit 142 and a single cargo unit or trailer 144. The trailer 144 may be fully enclosed, open such as a flat bed, or partially open depending on the type of goods or other cargo to be transported. In this example, the tractor unit 142 includes the engine and steering systems (not shown) and a cab 146 for a driver and any passengers.

As seen in the side view of FIG. 1D, the trailer 144 includes a hitching point, known as a kingpin, 148, as well as landing gear 150 for when the trailer is detached from the tractor unit. The kingpin 148 is typically formed as a solid steel shaft, which is configured to pivotally attach to the tractor unit 142. In particular, the kingpin 148 attaches to a trailer coupling 152, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 154 and 156 disposed therealong. For instance, sensor unit 154 may be disposed on a roof or top portion of the cab. The sensor unit 154 may be a sensor suite having an elongated central member 154a with one or more types of sensors located therealong (e.g., camera and/or radar modules) and side members 154b that may include other sensor types (e.g., short range lidar modules capable of detecting objects within 10-25 meters of the vehicle and/or long range lidar modules capable of detecting objects beyond 15-20 meters and up to 100-250 meters). Sensor units 156 may be disposed on left and/or right sides of the cab. Sensor units may also be located along other regions of the cab, such as along the front bumper or hood area, in the rear of the cab, adjacent to the fifth-wheel, underneath the chassis, etc. The trailer 154 may also have one or more sensor units 158 disposed therealong, for instance along one or both side panels, front, rear, roof and/or undercarriage of the trailer 154.

The perspective view 160 of FIG. 1E illustrates an example panel truck or other vehicle that may be suitable for local deliveries (e.g., groceries, meals, mail or other packages, etc.). Here, in contrast to the roof-top housing unit 154 shown in FIGS. 1C-D, the truck 160 may have a pair of sensor assemblies disposed in housings 162 on either side of the vehicle.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors such as geolocation-based (e.g., GPS) positioning sensors, load cell or pressure sensors (e.g., piezoelectric or mechanical), inertial (e.g., accelerometer, gyroscope, etc.).

Figure 2:
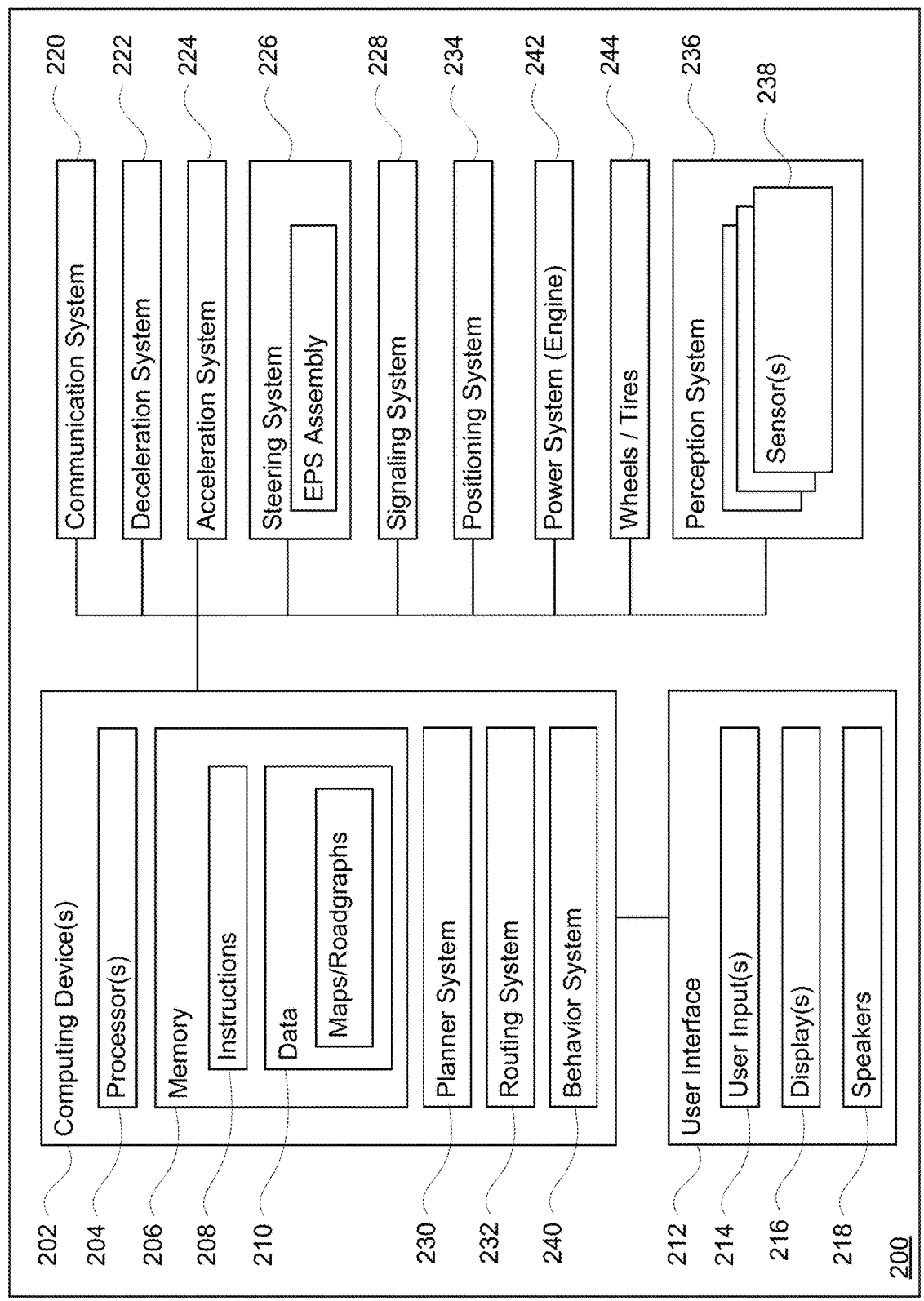
FIG. 2 illustrates components of a self-driving vehicle in accordance with aspects of the technology.

As shown in system diagram 200 of FIG. 2, the vehicle such as vehicle 100, 120 or 160 may have one or more computing devices, such as computing device 202 containing one or more processors 204, memory 206 and other components typically present in general purpose computing devices.

The memory 206 stores information accessible by the one or more processors 204, including and instructions 208 and data 210 that may be executed or otherwise used by the processor(s) 204. The memory 206 may be of any type capable of storing information accessible by the processor, including a computing device or computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 208 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 210 may be retrieved, stored or modified by processor 204 in accordance with the instructions 208. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 204 may be any conventional processors, such as commercially available CPUs, GPUs or TPUs. Alternatively, the one or more processors may include a dedicated device such as an ASIC or other hardware-based processor. Although FIG. 2 functionally illustrates the processor, memory, and other elements of computing device 202 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 202. Accordingly, references to a processor or computing device will be understood to include references to a collection of processors or computing devices or memories that may or may not operate in parallel.

Computing devices 202 may include all of the components normally used in connection with a computing device such as the processor and memory described above as well as a user interface 212 having one or more user inputs 214 (e.g., one or more of a button, mouse, keyboard, touch screen, gesture input and/or microphone), various electronic displays 216 (e.g., a monitor having a screen or any other electrical device that is operable to display information), and speakers 218 to provide information to a passenger of the autonomous vehicle or other people as needed. For example, electronic display 216 may be located within a cabin of autonomous vehicle 100, 120 or 160 and may be used by computing devices 202 to provide information to passengers or delivery personnel within the autonomous vehicle 100, 120 or 160.

Computing devices 202 may also include a communication system 220 having one or more wireless connections to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Computing devices 202 may be part of an autonomous control system for the autonomous vehicle 100, 120 or 160 and may be capable of communicating with various components of the vehicle in order to control the vehicle in an autonomous driving mode. For example, computing devices 202 may be in communication with various systems of autonomous vehicle 100, 120 or 160, such as deceleration system 222, acceleration system 224, steering system 226, signaling system 228, planning system 230 (also referred to as a planning/trajectory module), routing system 232, positioning system 234 (for determining the position of the vehicle such as its pose, e.g., position and orientation along the roadway or pitch, yaw and roll of the vehicle chassis relative to a coordinate system), perception system 236 having one or more sensors 238, behavior modeling system 240 (also referred to as a behavior module), and power system 242 in order to control the movement, speed, etc. of autonomous vehicle 100, 120 or 160 in accordance with the instructions 208 of memory 206 in the autonomous driving mode.

As an example, computing devices 202 may interact with deceleration system 222 and acceleration system 224 in order to control the speed of the vehicle. Similarly, steering system 226 may be used by computing devices 202 in order to control the direction of autonomous vehicle 100, 120 or 160. For example, if autonomous vehicle 100, 120 or 160 is configured for use on a road, such as a car or truck, steering system 226 may include components to control the angle of wheels 244 to turn the vehicle, such as an electronic power steering (EPS) system having a rack and pinion arrangement. Some or all of the wheels/tires 244 may be coupled to the EPS system. The computing devices 202 may be able to receive information about tire pressure, balance and other factors that may impact driving in an autonomous mode. Computing devices 202 may also use the signaling system 228 in order to signal the vehicle's intent to other drivers or vehicles, for example, by lighting turn signals or brake lights when needed.

Routing system 232 may be used by computing devices 202 in order to generate a route to a destination using map information. Planning system 230 may be used by computing device 202 in order to generate short-term trajectories that allow the vehicle to follow routes generated by the routing system. In this regard, the planning system 230 and/or routing system 232 may store detailed map information, e.g., pre-stored, highly detailed maps identifying a road network including the shape and elevation of roadways, lane lines, intersections, crosswalks, speed limits, traffic signals, buildings, signs, real time traffic information (updated as received from a remote computing device, such as the computing devices discussed below or other computing devices), pullover spots, vegetation, or other such objects and information.

The map information may be configured as a roadgraph. The roadgraph may include a plurality of graph nodes and edges representing features such as crosswalks, traffic lights, road signs, road or lane segments, etc., that together make up the road network of the map information. Each edge is defined by a starting graph node having a specific geographic location (e.g., latitude, longitude, altitude, etc.), an ending graph node having a specific geographic location (e.g., latitude, longitude, altitude, etc.), and a direction. This direction may refer to a direction the autonomous vehicle 100 must be moving in in order to follow the edge (i.e., a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes. The edges may represent driving along the same lane or changing lanes. Each node and edge may have a unique identifier, such as a latitude and longitude location of the node or starting and ending locations or nodes of an edge. In addition to nodes and edges, the map may identify additional information such as types of maneuvers required at different edges as well as which lanes are drivable.

The routing system 232 may use the aforementioned map information to determine a route from a current location (e.g., a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

The map information used for routing may be the same or a different map as that used for planning trajectories. For example, the map information used for planning routes not only requires information on individual lanes, but also the nature of lane boundaries (e.g., solid white, dash white, solid yellow, etc.) to determine where lane changes are allowed. However, unlike the map used for planning trajectories, the map information used for routing need not include other details such as the locations of crosswalks, traffic lights, stop signs, etc., though some of this information may be useful for routing purposes. For example, between a route with a large number of intersections with traffic controls (such as stop signs or traffic signal lights) versus one with no or very few traffic controls, the latter route may have a lower cost (e.g., because it is faster) and therefore be preferable.

Positioning system 234 may be used by computing devices 202 in order to determine the vehicle's relative or absolute position on a map or on the earth. For example, the positioning system 234 may include a GPS receiver or to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of a roadgraph as well as relative location information, such as location relative to other cars immediately around it, which can often be determined with less noise than the absolute geographical location.

The positioning system 234 may also include other devices in communication with computing devices 202, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

The perception system 236 includes one or more components (sensors 238) for detecting objects external to the vehicle such as other road users (vehicles, pedestrians, bicyclists, etc.) obstacles in the roadway, traffic signals, signs, trees, buildings, etc. For example, the sensors 238 of the perception system 236 may include lidar, sonar, radar, cameras, microphones (e.g., in an acoustical array for instance arranged along the roof pod 102), pressure or inertial sensors, strain gauges, and/or any other detection devices that generate and/or record data which may be processed by the computing devices of computing devices 202. In the case where the vehicle is a passenger vehicle such as a minivan 100 or car 120, the vehicle may include lidar, cameras, and/or other sensors mounted on or near the roof, fenders, bumpers or other convenient locations as shown in FIGS. 1A-B.

Such sensors of the perception system 236 may detect objects in the vehicle's external environment and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 236 may also include other sensors within the vehicle to detect objects and conditions within the vehicle, such as in the passenger compartment or storage compartment (e.g., trunk). For instance, such sensors may detect one or more persons, pets, packages, etc., as well as conditions within and/or outside the vehicle such as temperature, humidity, etc. Still further, sensors 238 of the perception system 236 may measure the rate of rotation of the wheels 244, an amount or a type of braking by the deceleration system 222, and other factors associated with the equipment of the vehicle itself.

The raw data obtained by the sensors (e.g., camera imagery, lidar point cloud data, radar return signals, acoustical information, etc.) can be processed by the perception system 236 and/or sent for further processing to the computing devices 202 periodically or continuously as the data is generated by the perception system 236. Computing devices 202 may use the positioning system 234 to determine the vehicle's location and perception system 236 to detect and respond to objects and roadway information (e.g., signage or road markings) when needed to reach the location safely, such as by adjustments made by planner/trajectory module 230, including adjustments in operation to deal with sensor occlusions and other issues.

In some instances, object characteristics may be input into a behavior prediction system software module of the behavior modeling system 240 which uses various behavior models based on object type to output one or more predicted future behaviors for a detected object. Object trajectories may be a list of positions and orientations or headings (e.g., poses) as well as other predicted characteristics such as speed, acceleration or deceleration, rate of change of acceleration or deceleration, etc. In other instances, the characteristics obtained from the perception system 236 may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle.

Detected objects, predicted future behaviors, various likelihoods from detection system software modules, the map information identifying the vehicle's environment, position information from the positioning system 234 identifying the location and orientation of the vehicle, a destination location or node for the vehicle as well as feedback from various other systems of the vehicle may be input into a planning system software module of the planner system 230. The planner system 230 may use this input to generate trajectories for the vehicle to follow for some brief period of time into the future based on a route generated by a routing module of the routing system 232. In this regard, the trajectories may define the specific characteristics of acceleration, deceleration, speed, direction, etc. to allow the vehicle to follow the route towards reaching a destination. A control system software module of computing devices 202 may be configured to control movement of the vehicle, for instance by controlling braking, acceleration and steering of the vehicle, in order to follow a trajectory.

The computing devices 202 may control the vehicle in one or more of the autonomous driving modes by controlling various components. For instance, by way of example, computing devices 202 may navigate the vehicle to a destination location completely autonomously using data from the detailed map information and planner system 230. Computing devices 202 may use the positioning system 234 to determine the vehicle's location and perception system 236 to detect and respond to objects when needed to reach the location safely. Again, in order to do so, computing device 202 and/or planner system 230 may generate trajectories and cause the vehicle to follow these trajectories, for instance, by causing the vehicle to accelerate (e.g., by supplying fuel or other energy to the engine or power system 242 by acceleration system 224), decelerate (e.g., by decreasing the fuel supplied to the engine or power system 242, changing gears, and/or by applying brakes by deceleration system 222), change direction (e.g., by turning the front or rear wheels of autonomous vehicle 100, 120 or 160 via the EPS system of the steering system 226), and signal such changes (e.g., by lighting turn signals) using the signaling system 228. Thus, the acceleration system 224 and deceleration system 222 may be part of a drivetrain that includes various components between an engine of the vehicle and the wheels of the vehicle. Again, by controlling these systems, computing devices 202 may also control the drivetrain of the vehicle in order to maneuver the vehicle autonomously.

Figure 3A:
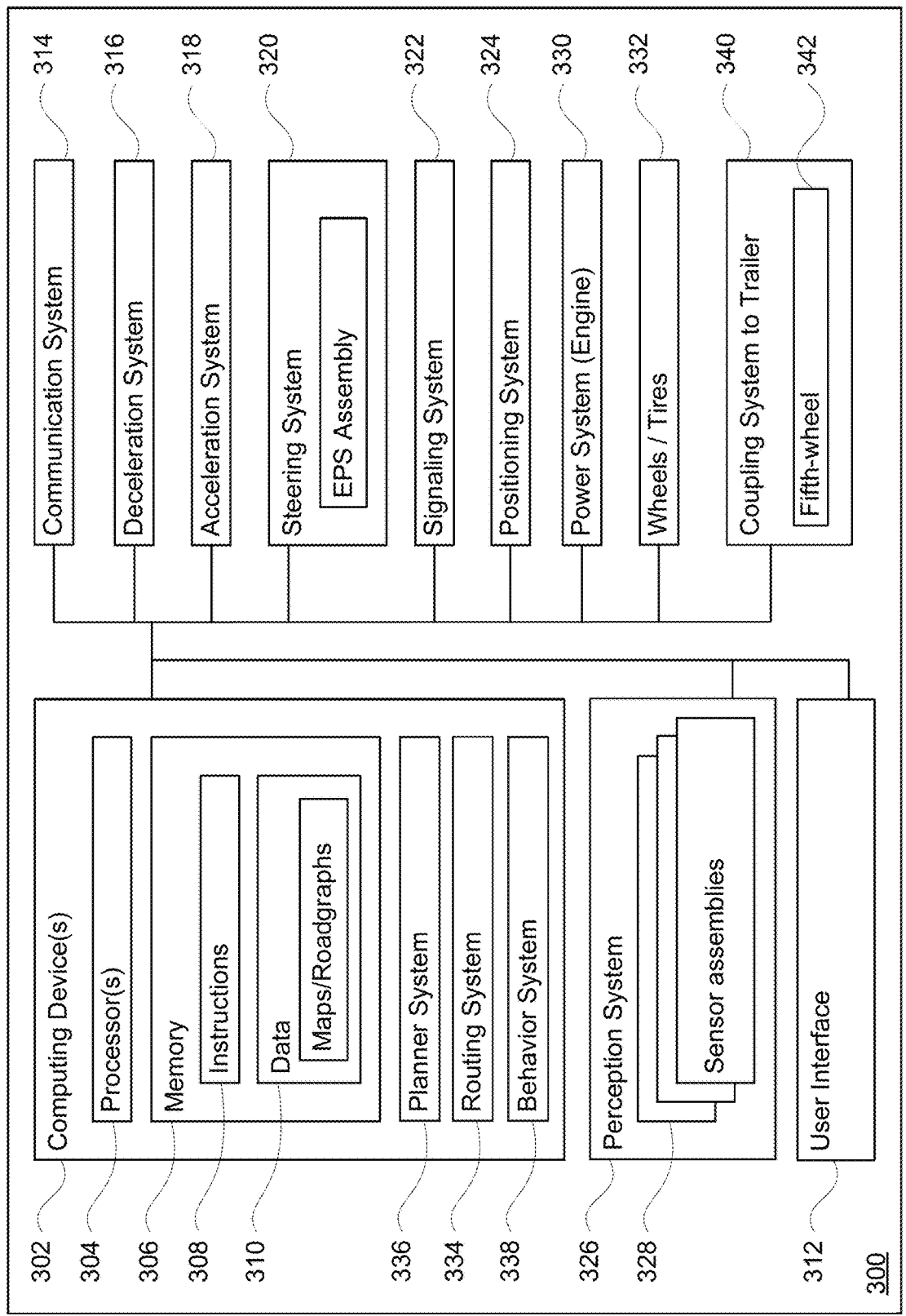
FIGS. 3A-B are block diagrams of systems of an example cargo-type vehicle in accordance with aspects of the technology.

FIG. 3A illustrates a block diagram 300 with various components and systems of a vehicle, e.g., vehicle 140 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2. For instance, the data may include map-related information (e.g., roadgraphs).

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308. Here, as above, the system may include a user interface 312 having one or more user inputs, various electronic displays, and speakers.

In one example, the computing devices 302 may form an autonomous driving computing system incorporated into vehicle 140. Similar to the arrangement discussed above regarding FIG. 2, the autonomous driving computing system of block diagram 300 may be capable of communicating with various components of the vehicle in order to perform route planning and driving operations. Communication system 314 may provide one or more wireless connections in the manner described above for communication system 220. In addition or alternatively, the communication system may include the vehicle's internal communication bus (e.g., a Controller Area Network (CAN) bus or a FlexRay bus).

For example, the computing devices 302 may be in communication with various systems of the vehicle, such as a driving system including a deceleration system 316, acceleration system 318, steering system 320 such as an EPS system having a rack and pinion arrangement, signaling system 322, and a positioning system 324, each of which may function as discussed above regarding FIG. 2.

The computing devices 302 are also operatively coupled to a perception system 326 having one or more sensor assemblies 328, as well as a power system 330. Some or all of the wheels/tires 332 are coupled to the driving system, and the computing devices 202 may be able to receive information about tire pressure, balance, rotation rate and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information, routing system 334, planner system 336 and/or behavior system 338. For instance, computing devices 302 may employ a planner/trajectory module of the planner system 336 in conjunction with the positioning system 324, the sensor assemblies 328 of the perception system 326 and the routing system 334 to detect and respond to objects when needed to reach the location safely, similar to the manner described above for FIG. 2.

Similar to perception system 236, the perception system 326 also includes one or more sensors or other components such as those described above for detecting objects external to the vehicle, objects or conditions internal to the vehicle, and/or operation of certain vehicle equipment such as the wheels and driving system. Each sensor assembly 328 may include one or more sensors. In one example, a pair of sensor assemblies 328 may be arranged as sensor towers integrated into the side-view mirrors on the truck, farm equipment, construction equipment or the like. In another example, sensor assemblies 328 may also be positioned at different locations on the tractor unit 142 or on the trailer 144, as noted above with regard to FIGS. 1C-D. The computing devices 302 may communicate with the sensor assemblies located on both the tractor unit 142 and the trailer 144. Each assembly may have one or more types of sensors such as those described above.

Also shown in FIG. 3A is a coupling system 340 for connectivity between the tractor unit and the trailer. The coupling system 340 may include one or more power and/or pneumatic connections (not shown), and a fifth-wheel 342 at the tractor unit for mechanical connection to the kingpin at the trailer.

Figure 3B:
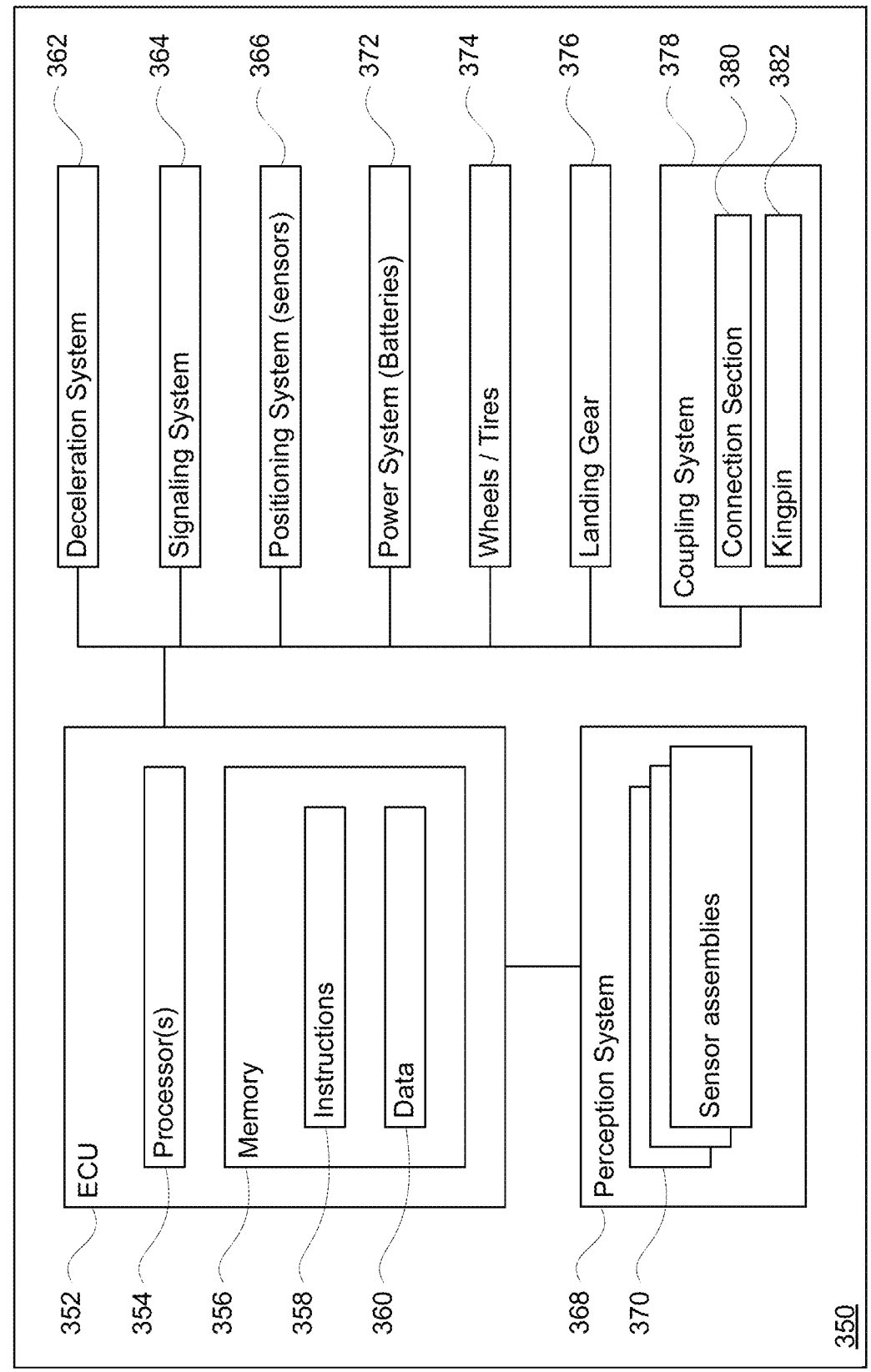

FIG. 3B illustrates a block diagram 350 of systems of an example trailer, such as trailer 144 of FIGS. 1C-D. As shown in this example, the system includes a trailer ECU 352 of one or more computing devices, such as computing devices containing one or more processors 354, memory 356 and other components typically present in general purpose computing devices. The memory 356 stores information accessible by the one or more processors 354, including instructions 358 and data 360 that may be executed or otherwise used by the processor(s) 354. The descriptions of the processors, memory, instructions and data from FIGS. 2 and 3A apply to these elements of FIG. 3B.

The trailer ECU 352 in this example is configured to receive information and control signals from the tractor unit, as well as information from various trailer components. The on-board processors 354 of the ECU 352 may communicate with various systems of the trailer, including a deceleration system 362, signaling system 364, and a positioning system 366. The ECU 352 may also be operatively coupled to a perception system 368 with one or more sensors arranged in sensor assemblies 370 for detecting objects in the trailer's driving environment. The ECU 352 may also be operatively coupled with a power system 372 (for example, a battery power supply) to provide power to local components. Some or all of the wheels/tires 374 of the trailer may be coupled to the deceleration system 362, and the processors 354 may be able to receive information about tire pressure, balance, wheel speed and other factors that may impact driving in an autonomous mode, and to relay that information to the processing system of the tractor unit. The deceleration system 362, signaling system 364, positioning system 366, perception system 368, power system 372 and wheels/tires 374 may operate in a manner such as described above with regard to FIGS. 2 and 3A.

The trailer also includes a set of landing gear 376, as well as a coupling system 378. The landing gear may provide a support structure for the trailer when decoupled from the tractor unit. The coupling system 378, which may be a part of coupling system 340 of FIG. 3A, provides connectivity between the trailer and the tractor unit. Thus, the coupling system 378 may include a connection section 380 (e.g., for communication, power and/or pneumatic links to the tractor unit). In this example, the coupling system also includes a kingpin 382 configured for connectivity with the fifth-wheel of the tractor unit.

FIG. 4 illustrates an example electronic power steering system 400, which may be evaluated and controlled in accordance with the techniques discussed herein. In this example, the system 400 has a rack and pinion mechanism 402 that is coupled to steering column 404 and steering rack unit 406. In an alternative, the system may operate using a steer-by-wire approach. In that case, neither the steering column nor the rack and pinion mechanism would be needed. The mechanism 402 may include a torque sensor. The steering rack unit 406 may include a recirculating ball gear (not shown). Tie rods 408 extend from either end of the steering rack unit 406, with hub units 410 configured for coupling to the vehicle's wheels (not shown). In this example, an electric motor 412 is operatively coupled to the steering rack unit 406. The electric motor 412 may include an integrated steering control unit (not shown) that enables both fully and partially autonomous driving modes. Alternatively, a hydraulic steering system may be employed. In that case, frozen or otherwise contaminated hydraulic fluid could also have adverse (e.g., sticking) movement patterns and high friction. In an autonomous driving mode, the steering control unit is able to receive a position or torque command from the network such as a CAN bus, FlexRay, etc., (as well as information about other vehicle parameters) in order to determine an appropriate amount of steering support. This information is used by the electric motor 412 to provide steering assistance as needed.

Figure 5A:
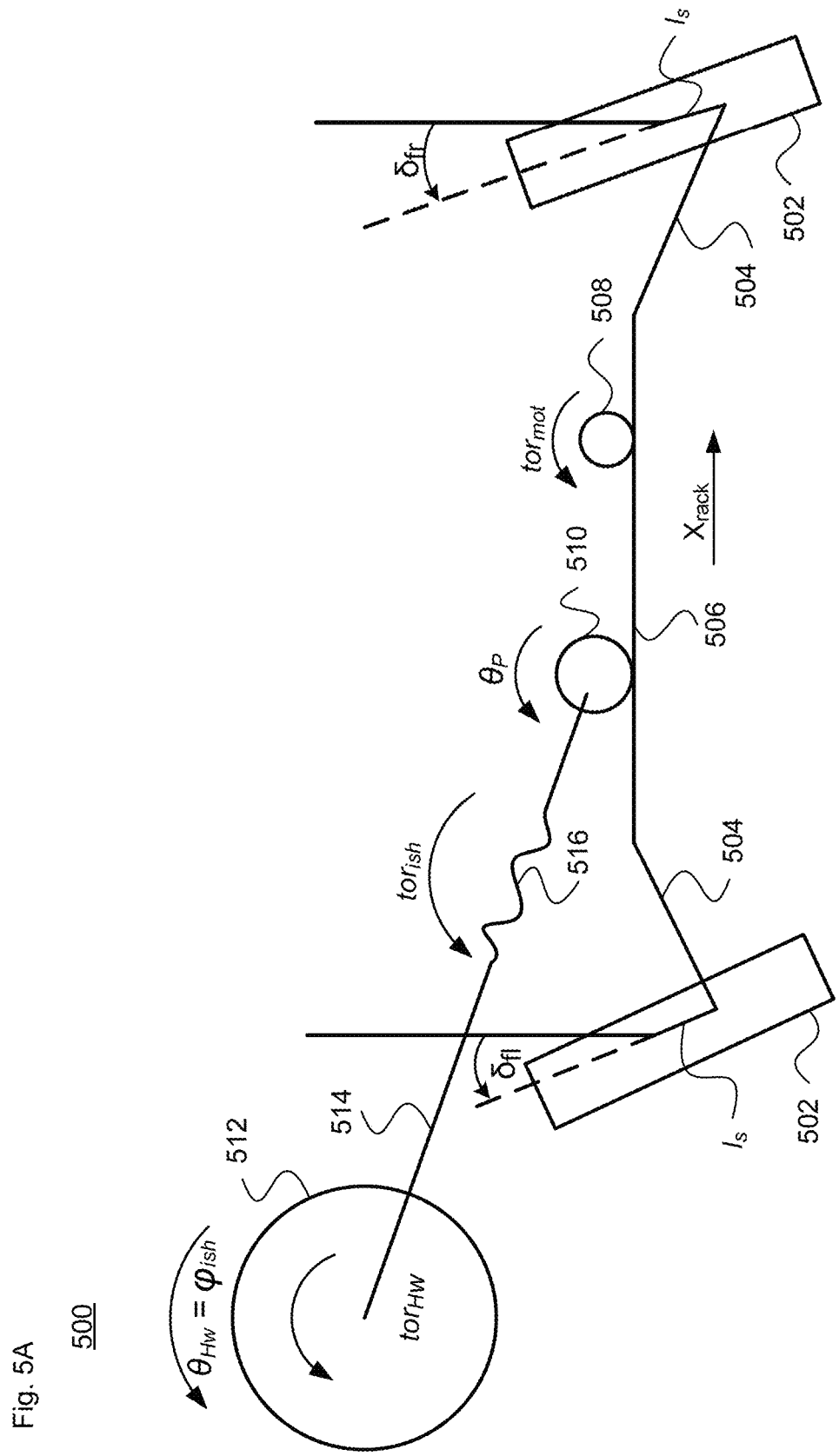
FIGS. 5A-B illustrate tire and steering-related information in accordance with aspects of the technology.
Figure 5B:
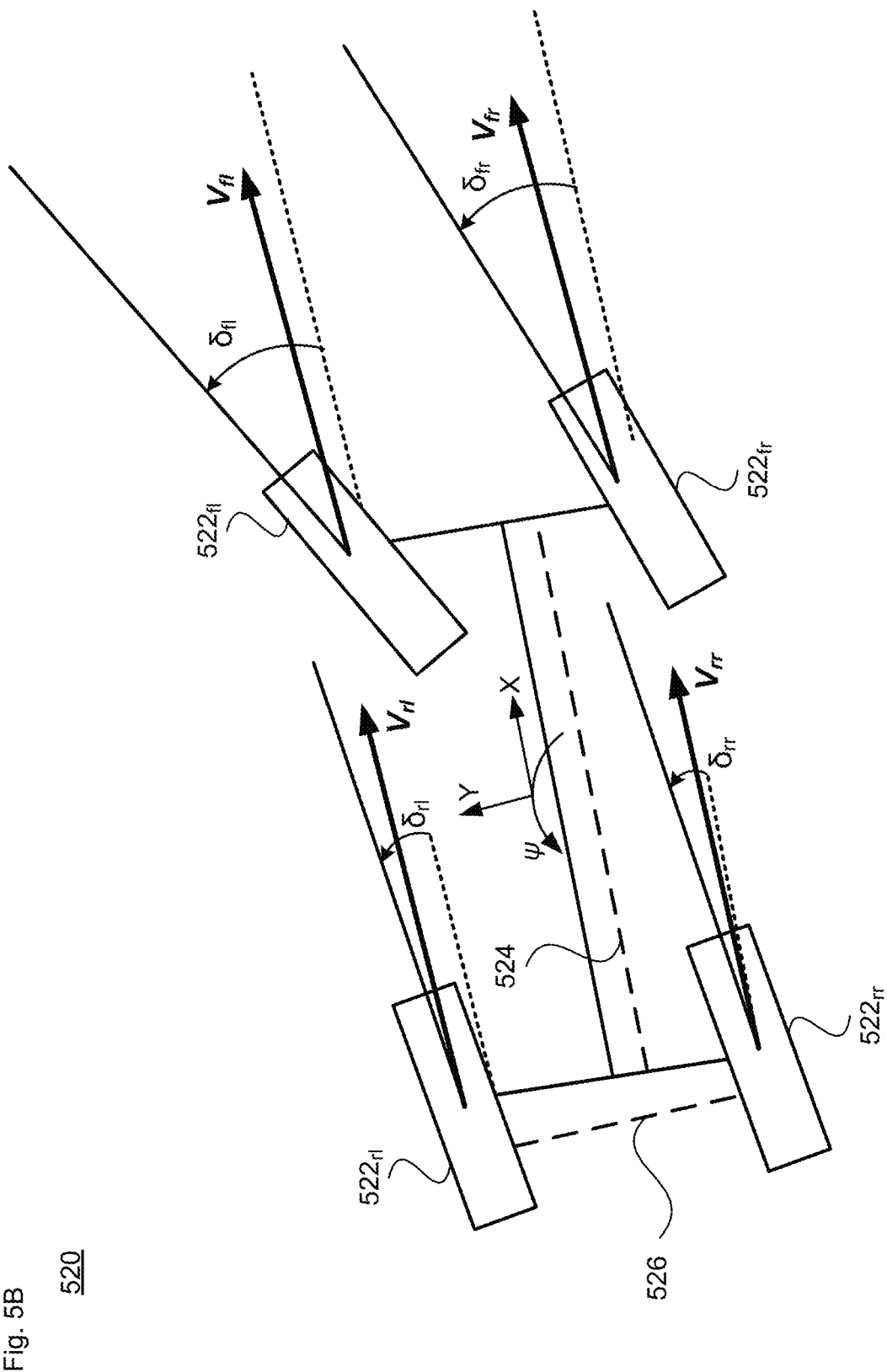

FIGS. 5A-B illustrate aspects of the vehicle including the steering system, in accordance with one example configuration. As shown in view 500 of FIG. 5A, wheels 502 are coupled to tie rods 504, which are coupled to respective ends of steering rack unit 506. A motor gear 508 engages the steering rack unit 506. Pinion gear 510 is coupled to the steering rack unit 506 and is engaged with hand wheel (steering wheel) 512 via input shaft 514 and torsion bar 516. As noted in this figure, there is a translational angle degree of freedom for the steering rack displacement (rack position $x_{rack}$), which is positive to the right (unit of m). The front right wheel has a wheel angle $\delta_{fr}$ and the left front wheel has a wheel angle $\delta_{fl}$ (radians). The motor gear 508 has a torque to $tor_{mot}$, the input shaft 514 has a torque $tor_{ish}$, and the external torque to the steering wheel is $tor_{hw}$ (each in units of Nm). Here, $tor_{hw}$ is associated with the steering wheel interface. A hand wheel angle $\Theta_{Hw}$ and an input shaft angle $\Phi_{ish}$ (in degrees or radians) are also shown. Pinion angle is $\Theta_P$ (in radians). The rack position $x_{rack}$ and the pinion angle $\Theta_P$ are also illustrated (translational ↔ rotational via the steering rack ratio, c-factor). The pinion angle is equated to a transmission ratio for the rack position.

As shown in view 520 of FIG. 5B, the right and left front and rear wheels 522 ($522_{fr}$, $522_{fl}$, $522_{rr}$, $522_{rl}$) each has a corresponding wheel angle $\delta_{fr}$, $\delta_{fl}$, $\delta_{rr}$, $\delta_{rl}$, and speed vector $V_{fr}$, $V_{fl}$, $V_{rr}$, $V_{rl}$, respectively (that can be decomposed to longitudinal and lateral speed components in the wheels' axis system). This example vehicle representation has a wheel base 524 and a track width 526. This figure also shows degrees of freedom per the longitudinal position (X axis) and lateral position (Y axis) at the center of gravity, and the yaw angle w. For the front axle inertia, everything can be referred to the steering rack body, which can be a constant value referred to the steering rack coordinate frame (thus mass). Vehicle speed is referenced to the speed along the X axis. Lateral acceleration refers to the vehicle acceleration along the Y axis.

Example Implementations

As noted above, there are different validation options that can be employed to detect and mitigate a blocked steering actuator for a vehicle configured to operate in an autonomous driving mode. For instance, an analyzer for driven miles could be utilized, which has a "sliding window" style sampling interval, where over an X second time interval there is a check for the number of periods or cycles within a certain frequency range Y. The analyzer would demonstrate whether the nominal autonomous driving behavior falls within a validated amplitude vs. frequency space. Regressions in performance can be identified with comparisons between miles driven for each onboard release (each newly released version of the autonomous driving software). However, steering system response may not be representative of behavior when frozen water is present, since the position deviation each time the rack bar binds or fails to move will not be present in nominal driven miles. In addition, this approach would not encompass parked situations where the steering system does not have enough excitation.

Another option involves a closed loop vehicle and steering system controller model. This could employ a model of the base vehicle and also a model of a motion controller of the vehicle's computing system. Here, validation based on autonomous driving behavior could be conducted in a controlled system hardware-in-loop (HIL) environment, e.g., using trajectory playback or synthetic trajectories, without needing the full suite of vehicle hardware. Additional areas of the parameter space could be explored by changing the modeled path tracking response. However, correlation testing would be needed at the vehicle level to demonstrate that the closed loop model behavior, including position deviation and steering system controller response, are representative of true vehicle behavior. In addition, model updates would be required when the autonomous driving behavior or steering system controller performance changes.

A further option focuses on physical vehicle validation in cold ambient temperature conditions. Here, using a specially prepared steering gear, defined volumes of water would be injected into the steering gear housing. The vehicle would then be driven on a simulated straight freeway cycle to confirm the onset of freezing water can be sufficiently detected. On the one hand, this approach would provide direct validation of the movement pattern detection on vehicle, with a full autonomous driving control stack running on the onboard computing system. However, it may be very expensive to provide a suitable test facility, and validation would be limited to winter months of a calendar year. In addition, physical testing does not define all boundary conditions, which would mean that each time the motion control performance/behavior changed, revalidation would be required.

An alternative approach involves intrusive diagnostics. By way of example only, when the vehicle is operating in a partly or fully autonomous driving mode with an ambient temperature on the order of about 2° C. to 6° C. or lower, periodically issue a rack position command to the steering system, such as a pure sine wave having a specific frequency and amplitude. For instance, the amplitude of the sine wave may be on the order of +/−0.1 mm to +/−0.3 mm, with a frequency on the order of 1 Hz to 4 Hz and a full cycle of the sine wave approximately every 7-15 seconds. In order to avoid unnecessary diagnostic tests during vehicle operation, in one scenario the rack position command may only be issued when it is determined with a high degree of confidence (e.g., more than 95% likely) that the temperature is below a selected threshold (e.g., below 5° C. The base vehicle temperature reporting may be in accordance with Automotive Safety Integrity Level (ASIL) quality management (QM). Achieving a high ASIL rating can include utilizing two or more discrete temperature sources at different locations, such as a first ambient temperature sensor positioned at a first location along the vehicle such as near the steering system (or in or along the steering column), and a second ambient temperature sensor disposed in a sensor housing mounted on the vehicle such as roof pod assembly 102 of FIG. 1A. In addition, local weather information may be obtained from offboard sources, such as other vehicles in a nearby area (e.g., within a few blocks or within a mile or so of the vehicle's current location) or a local weather station. The discrete temperature sources may be heterogeneous sensors of different types. For instance, a thermocouple, an NTC (negative temperature coefficient) thermistor and/or other sensors can be used to measure the temperature at different locations across the vehicle. Suitable sensors could be, e.g., (i) onboard ambient temperature devices used for the vehicle's HVAC/climate control system that may be located in the front grill/radiator area, (ii) an intake air temperature sensor for an internal combustion engine (ICE), which can be located in the airbox of the ICE, and/or (iii) a bespoke ambient temperature sensor as part of the vehicle's self-driving system. By way of example, the vehicle may include ambient temperature sensors in different sensor housings of the perception system, e.g., on the corners of the vehicle and/or in the roof pod assembly. For high integrity, the system can employ diverse temperature sources that are free from common cause failures and that are not susceptible to the same influencing factors, such as radiated heat from other components (e.g., the engine), sun loading, etc. Using multiple diverse sensor sources, it is also possible to incorporate an ambient temperature model, so that certain influential factors can be minimized (e.g., heat soak, sun load, wind, etc.).

When the vehicle is stopped, for example at traffic light or between trips, the sine wave pulses can have an impact on the steering gear and suspension components. And when the vehicle is driving, issuance of the diagnostic command or repetition of the actuation may be selected to meet a selected rider discomfort value, which may be associated with vehicle lateral acceleration and/or lateral jerk.

Figure 6A:
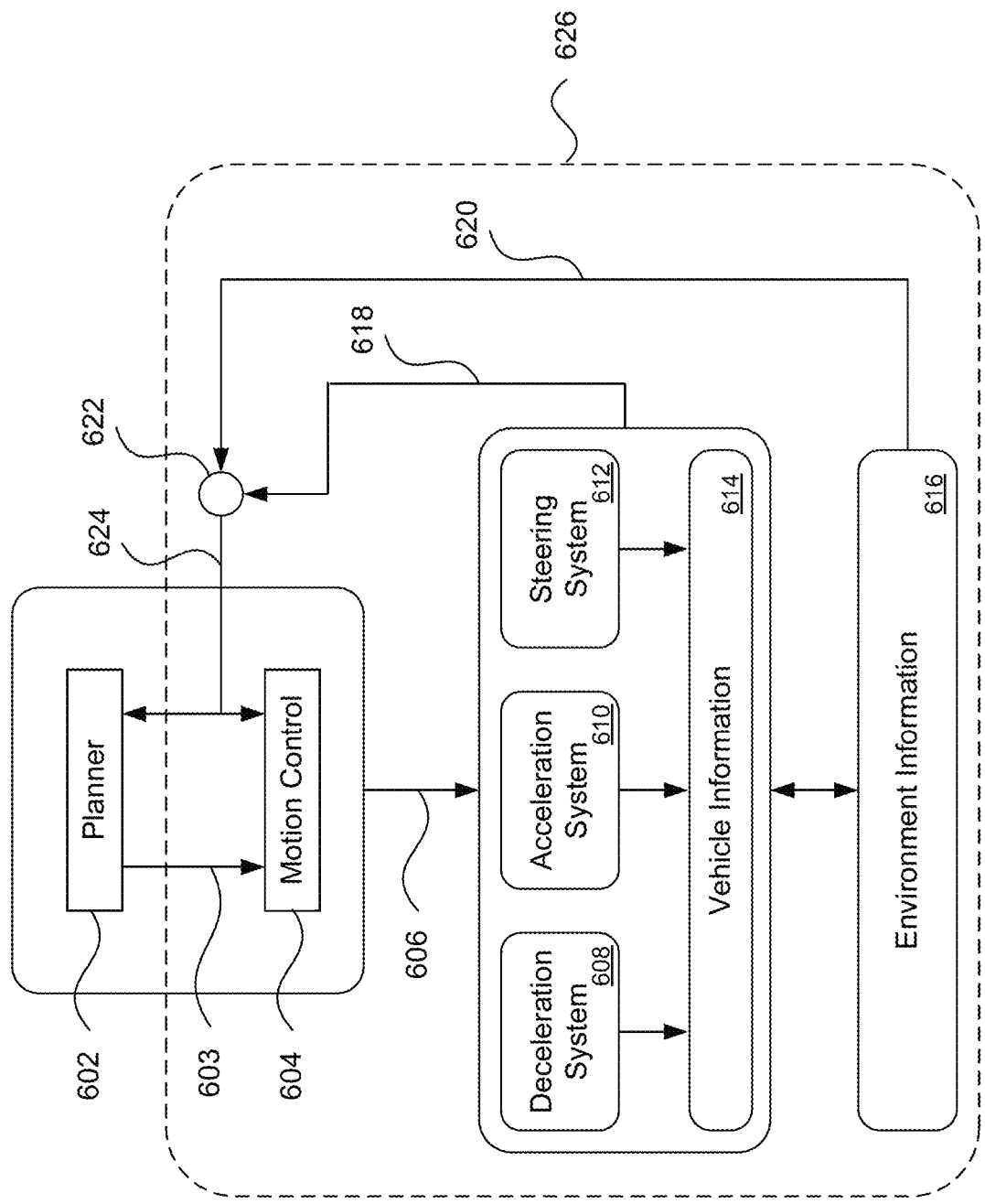

FIG. 6A illustrates an example 600 of a control stack for motion control operation of a vehicle in accordance with aspects of the technology. The planner module (block 602) is configured to determine a trajectory 603 of the vehicle in an autonomous driving mode. The planner module 602 may incorporate one or both of the control module's planner system and routing system (see, e.g., blocks 230 and 232 in FIG. 2). The motion control module (block 604) is configured to decompose the trajectory 603 generated by the planner into actuator commands. The actuator commands are passed to components of the vehicle's driving system as shown by arrow 606. For instance, actuator commands may be sent to the deceleration system 608 (e.g., corresponding to 222 in FIG. 2), acceleration system 610 (e.g., corresponding to 224 in FIG. 2) and/or the steering system 612 (e.g., corresponding to 226 in FIG. 2). By way of example, the actuator command to the deceleration system 608 may create a brake pressure torque via a braking action. The actuator command to the acceleration system may create an axle torque on the drivetrain during an acceleration action. And the actuator command to the steering system may change the rack position during a steering action. Each of these may affect the vehicle trajectory and comprise vehicle-related information 614. As shown in block 616, there may also be environment-related information that involves physical interaction with the environment. Such information can include, e.g., tire-road interaction (such as on wet or icy roads), disturbances (such as wind gusts), temperature, road grade-banking, etc. Vehicle-related information 618 and environment-related information 620 may be combined as shown at node 622, and fed back to the planner 620 and the motion control block 604, as shown by arrow 624. In this example, the vehicle's motion control system 626 (shown in the dashed region) may be everything here except the planner block 602.

Figure 6B:
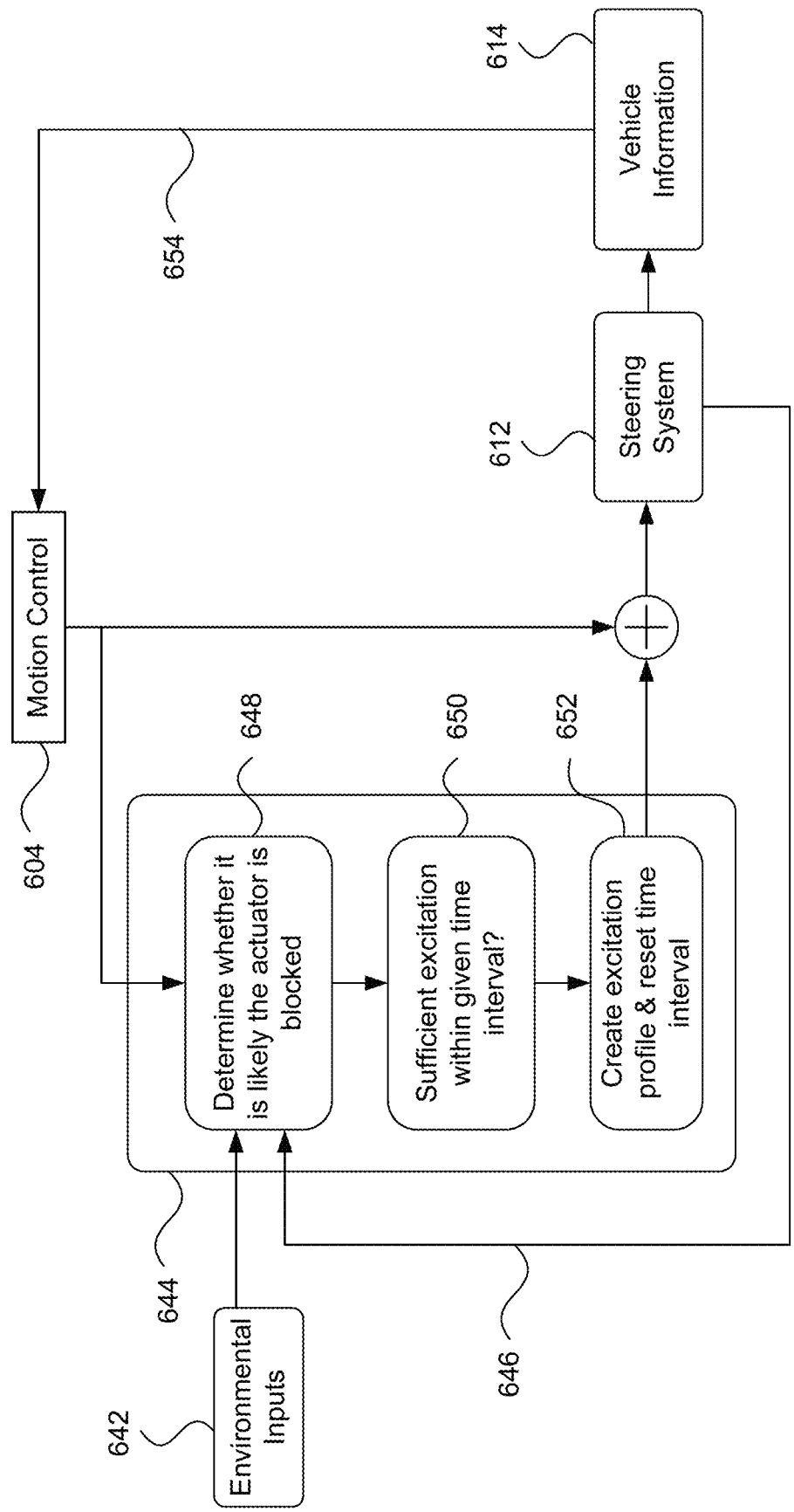

FIG. 6B presents a diagram 640 showing an approach for blocked actuator detection of a high-friction condition. A set of environmental inputs 642 is fed to blocked actuator detection module 644. When evaluating for a blocked actuator due to freezing water, the environmental inputs 642 include temperature information. This may comprise temperature values obtained via measurements by two or more different sensors of the vehicle and/or from received temperature data from external sources. For instance, there may be ambient temperature readings taken from the vehicle's environment such as taken from one or more thermocouple sensors disposed on a roof pod sensor assembly (see 102 of FIGS. 1A-B), temperature readings taken from inside the steering column (if available), local weather information received from nearby vehicles or obtained from a weather database, etc. This can be helpful to ensure that actuator commands to change the rack position are performed only when conditions warrant the change. The integrity of the temperature information may be particularly important, which is why having a plurality of diverse temperature sources is beneficial. In addition to receiving the set of environmental inputs 642, the module 644 also receives information 646 from the steering system 612. The information 646 can include rack position data from the EPS module such as the current torque, as well as system effort versus (rack) position. System effort is the input force to the steering rack, which is a function of for example rack position, vehicle speed, front axle load, etc.

The blocked actuator detection module 644 performs several evaluations before sending any actuator commands to the steering system 612. First, at block 648, the system determines whether is it likely for the actuator to be blocked (or otherwise subject to a high friction condition). This is based on the information from the environmental inputs 642, the rack position command(s) received from the motion control block 604, and information 646 from the steering system 612. Here, using blocking due to freezing water as an example, the system evaluates the temperature to see if it falls below a threshold temperature that indicates a freezing condition. For instance, if the overall temperature information is on the order of 5° C. or lower, this may indicate that the temperature inside the steering column or steering gear housing could be at or below 0° C. Thus, if water has made its way into the steering column or steering gear housing, it could begin to freeze and block the steering actuator, making control over the vehicle's trajectory difficult.

Another situation to evaluate for a blocked actuator condition is whether the amount of detected lubricant or power steering fluid falls below some threshold level. Here, even if it is not easy to directly detect the problem itself (such as loss of lubricant), the system may evaluate the vehicle's maintenance records to see what services have been performed and when they were performed. Low fluid or lubrication level (e.g., below the recommended level for that vehicle, e.g., as identified in an owner's manual) will result in accelerated wear of the internal components, which leads to increased internal friction. Once the friction becomes high enough, this will result in slow response and or position deviations of the steering gear, which can be detected by the algorithm. In a worst-case situation, the friction may increase to the point where the EPS motor can no longer deliver sufficient torque to overcome the friction and move the rack bar.

If the system determines at block 648 based on its inputs that a blocked actuator condition is not likely (e.g., below some threshold probability), then nothing further may be done by the blocked actuator detection module 644 (other than for the system to re-evaluate conditions at a later time). However, upon determination that the blocked actuator condition is likely (e.g., actual or expected blockage), at block 650 the system determines whether there has been sufficient excitation of the steering system within a given interval (e.g., a time interval or a distance of driving). For instance, has a command to the steering gear changed in X period of time (such as the last few seconds or minutes, or more or less)? By way of example on a flat, straight road, with no cross-wind and good wheel alignment, the vehicle could drive straight along a highway for many minutes (or miles) without making any trajectory corrections. Here, if there is water in the steering gear housing and the temperature is low enough, the water could partially or completely freeze before a steering command would be received. Any received steering commands at this point may not generate enough steering torque to break through the ice. Thus, the steering system may not be able to properly respond to the steering commands, potentially creating an unsafe situation where the actual trajectory would deviate from the planned trajectory.

Figure 6D:
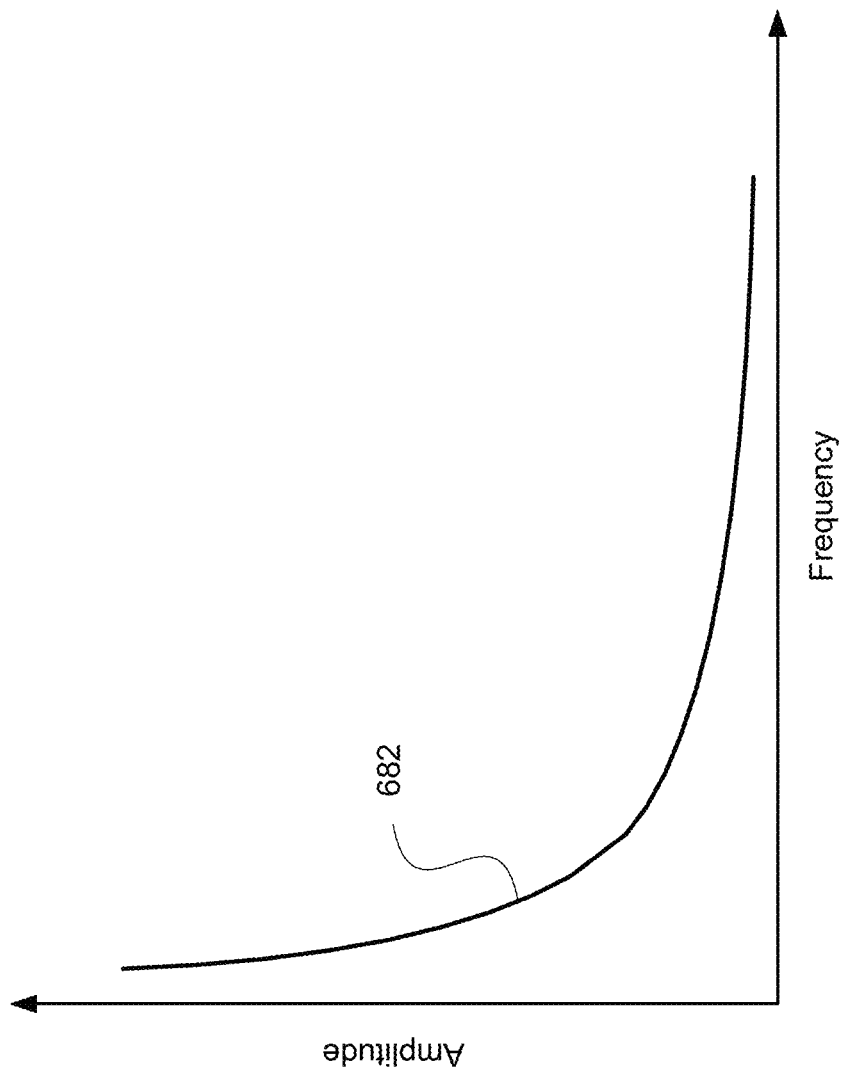

FIG. 6C illustrates a plot 660 showing an example frequency response function 662 of a bandpass filter. Such a filter can be used as a simple frequency-based diagnostic function to determine whether the signals of interest (e.g., rack position request and achieved rack position) have a sufficient or insufficient excitation based upon a signal response. The frequency-based diagnostic may be applied to the signal to evaluate the portions that fall above 664 and below 666 some threshold 668. If a sufficient part of the signal is above the threshold 668, then the excitation criterion has been met. FIG. 6D illustrates a plot 680 showing an example 682 of how the frequency spectrum of the rack position signal may look.

Returning to FIG. 6B, when the system determines that there has not been sufficient excitation of the steering system within the given time or distance interval, at block 652 the system creates an excitation profile that is sent to the EPS or other component of the steering system 612 (which also receives actuator commands from the motion control block 604). The steering system modifies the rack position in accordance with the excitation profile. Resultant achieved actual trajectory information 654 is provided to the motion control module 604. Once the excitation profile is created, block 652 also causes a reset to the time interval that will be evaluated at block 650 the next time the system performs the blocked actuation detection process.

FIGS. 7A-F are plots illustrating rack positing tracking from straight driving, where the motion control system is trying to maintain the straight path in the presence of steering system dynamics (actual response delays) and vehicle asymmetries. For example, the plots in these figures are based on a driving speed of 40 km/h. At time $t_2$, the system is engaged from manual driving to the autonomous mode. A sine wave with a period on the order of $(t_4-t_3)/2$, and a maximum excitation displacement of 0.2 mm is added to the steering rack position request between $t_3$ and $t_4$ and between $t_7$ and $t_8$. The sine wave is injected between time $t_3$ and $t_4$ while the motion control system identifies (e.g., 640 in FIG. 6B) the self-induced lateral position error (see eCTE in FIG. 7F) and tries to compensate for it.

FIG. 7A is an input shaft angle chart plotting data along an angle range $-\Phi_{max}$ to $+\Phi$max and between time $t_0$ and $t_9$. FIG. 7B is a rack displacement chart plotting distance (in mm) relative to time (for time $t_0$ to time $t_9$) showing data for actual rack displacement $702_A$, requested rack displacement $702_R$, and blocked actuation diagnosis ("BAD") $702_B$. Here, $702_B$ is a pure excitation sine wave added to output of the motion control system. Referring to FIG. 6B, the output of the block 652 is the signal for $702_B$, and the signal going to the steering system 612 is $702_R$. The signal $702_A$ is part of the information bundle in 646 issued by the steering system 612.

Figure 7C:
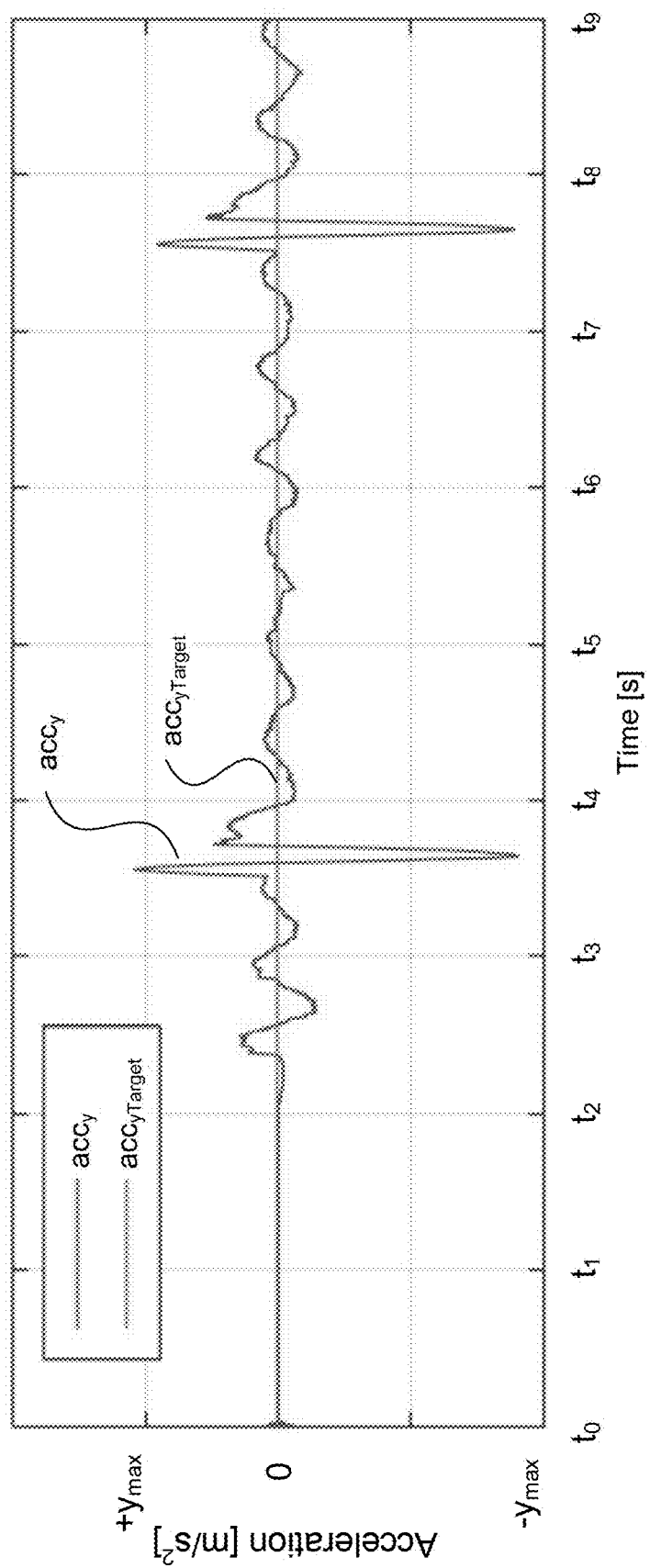
Figure 7D:
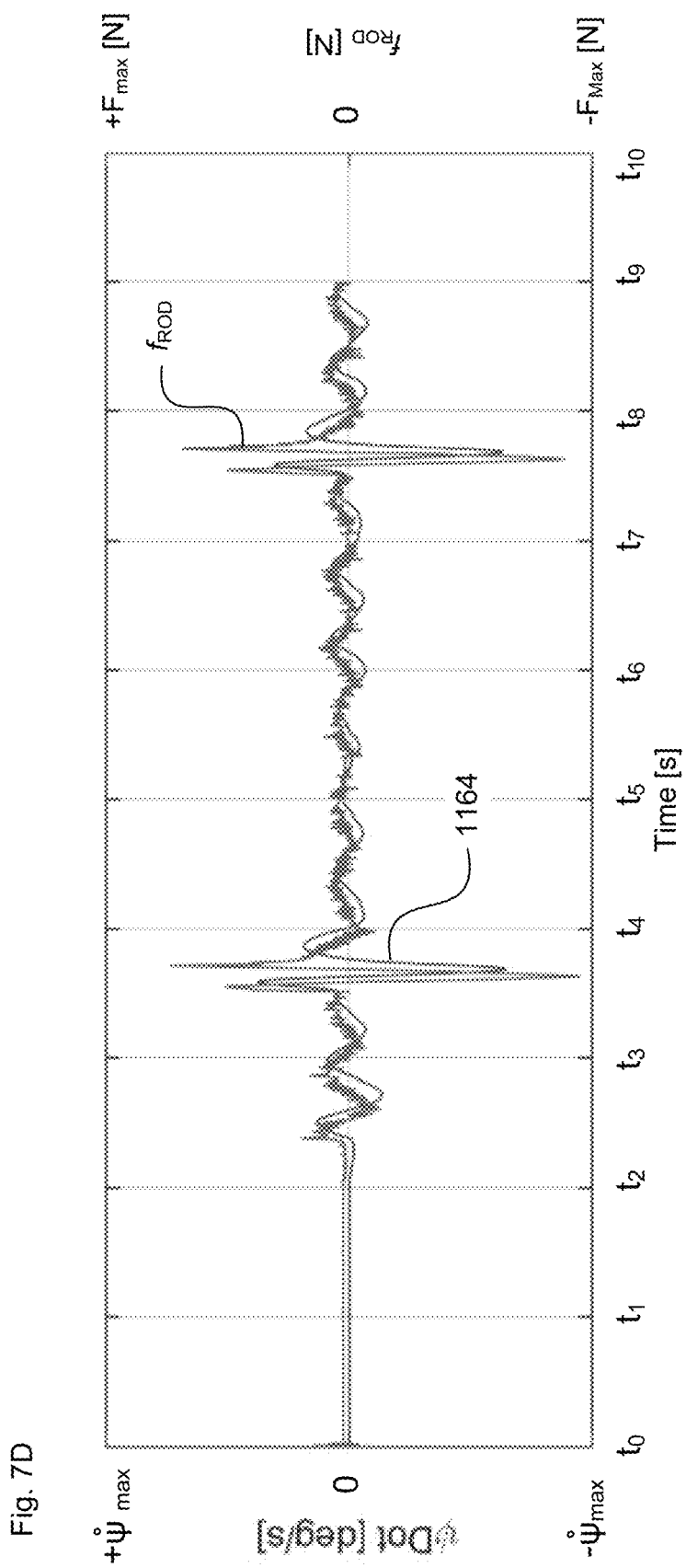
Figure 7E:
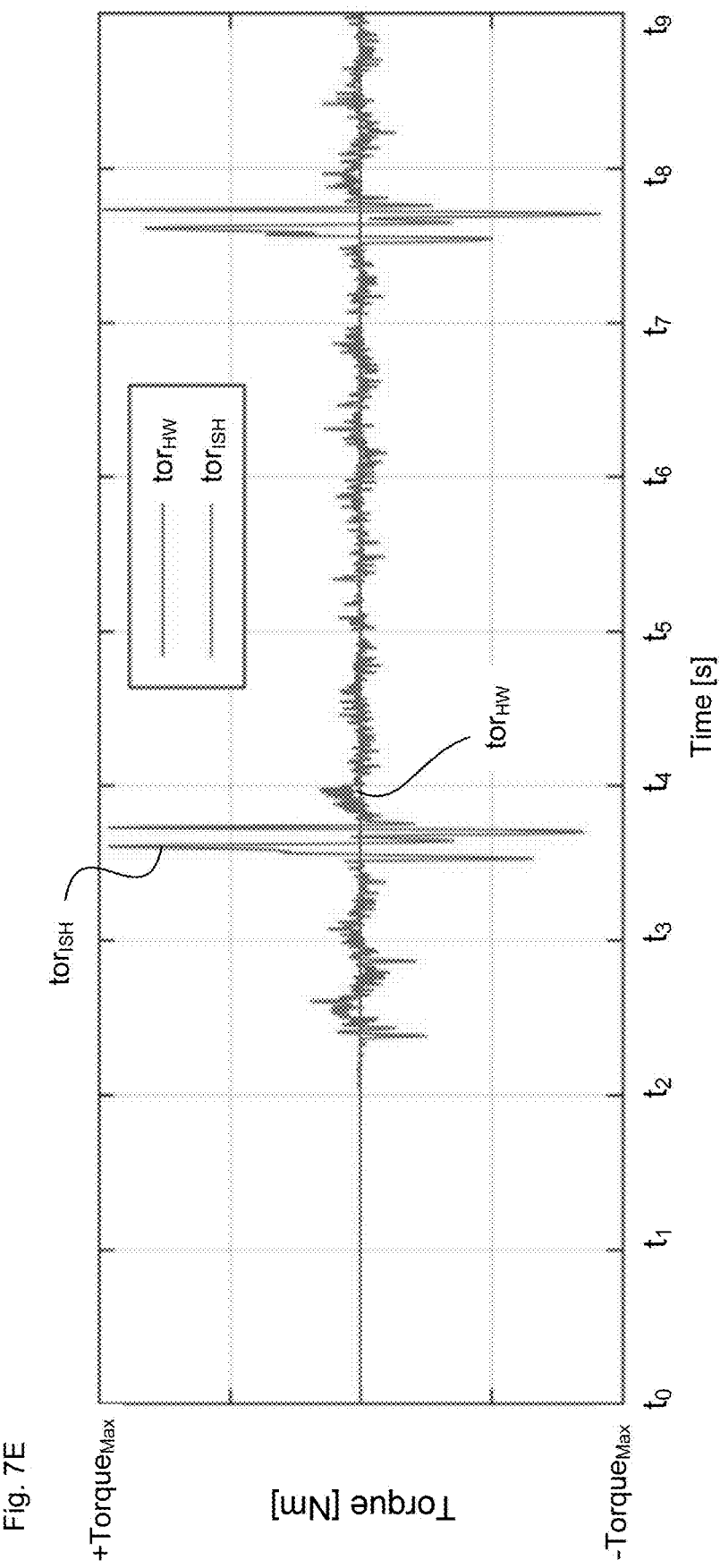

The acceleration chart of FIG. 7C compares lateral acceleration data $acc_y$ against a target lateral acceleration $acc_{yTarget}$ (straight driving example), over time $t_0$ to time $t_9$. As shown, the target is 0 m/s². FIG. 7D presents a yaw rate (Dot) chart in degrees/s along a range $-\psi$max to $+\psi$max and between time $t_0$ and $t_{10}$. This chart also plots the reaction force in Newtons along a range $-F_{Max}$ to $+F_{Max}$ in the same timeframe. FIG. 7E plots torque (Nm) over time (for time $t_0$ to time $t_9$) for the input shaft $tor_{ish}$, (e.g., 514 in FIG. 5A) and the external torque (0 external torque; the steering wheel is free moving with only the steering column friction acting to it) to the steering wheel $tor_{hw}$ (e.g., 512 in FIG. 5A).

Figure 7F:
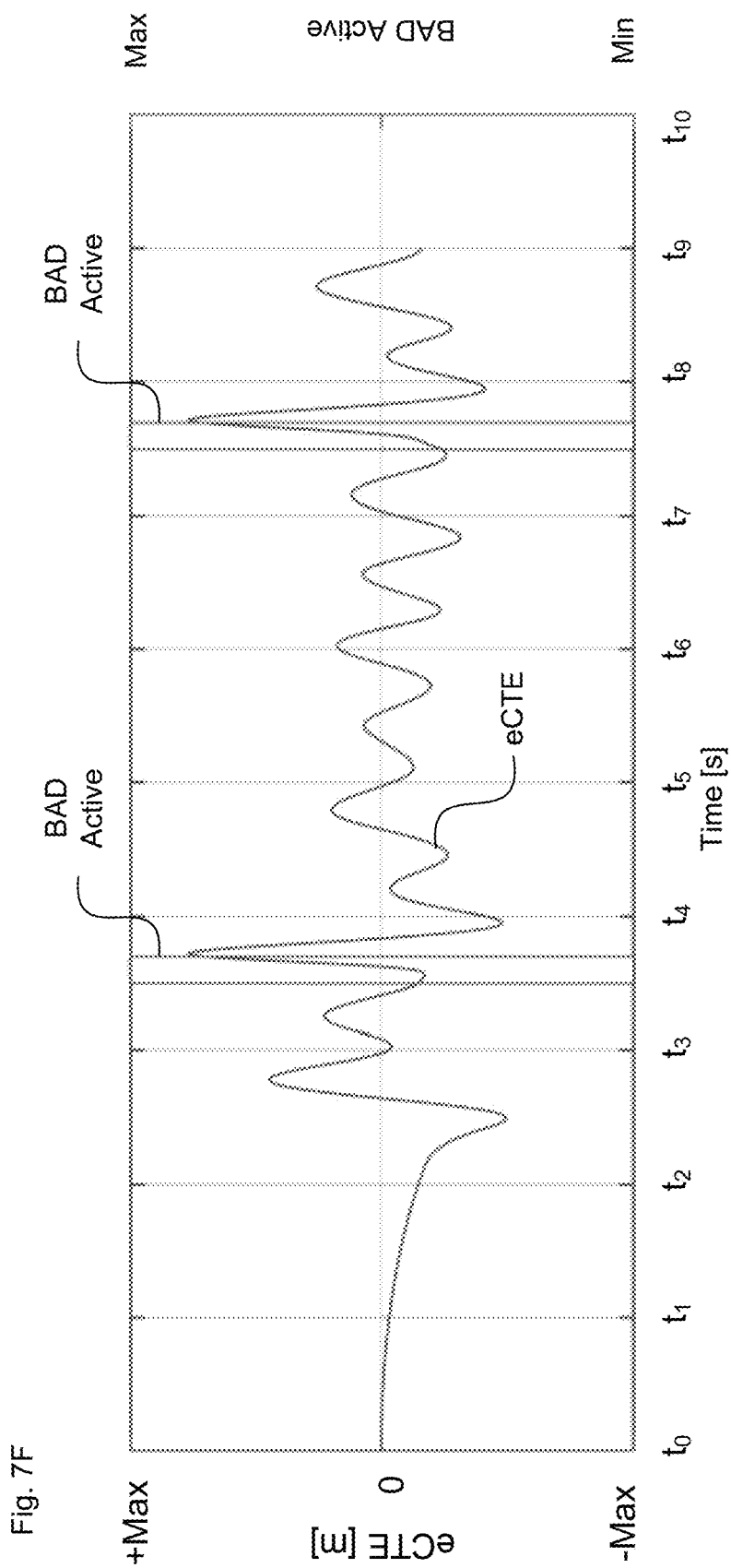

And FIG. 7F illustrates cross track error or lateral position error, with respect to the path (eCTE, distance in meters) and BAD Active during a given timeframe (for time $t_0$ to time $t_{10}$). BAD Active indicates when the system is adding the excitation sine wave in order to diagnose signs of a blocked steering system. An example would be frozen water.

When the system identifies blocked actuation patterns, the system can induce a very high frequency vibration in the steering actuator in attempt to resolve the blockage. Alternatively or additionally, the planner may select a trajectory that causes the vehicle to pull off the road onto the shoulder (or a side street or other location) in the autonomous driving mode. The change in trajectory may include taking an alternative route to the destination or other location, for instance a route selected to require less steering actuation or one that has a higher ambient temperature than the planned route (e.g., a surface street rather than a mountain road for a vehicle heading to or from a ski resort). Even more aggressive responses could be to perform emergency braking and/or stopping in the current driving lane. The vehicle's control system may contact remote assistance for support, service or towing. The onboard user interface may communicate the vehicle's status to any passengers.

Example System Architecture

Information associated with the detection and mitigation of a blocked steering actuator can be shared with other vehicles in the nearby driving environment. For instance, information about ambient temperature or other environmental conditions could be shared with a fleet of vehicles either via direct communication or via a back-end system.

Figure 8A:
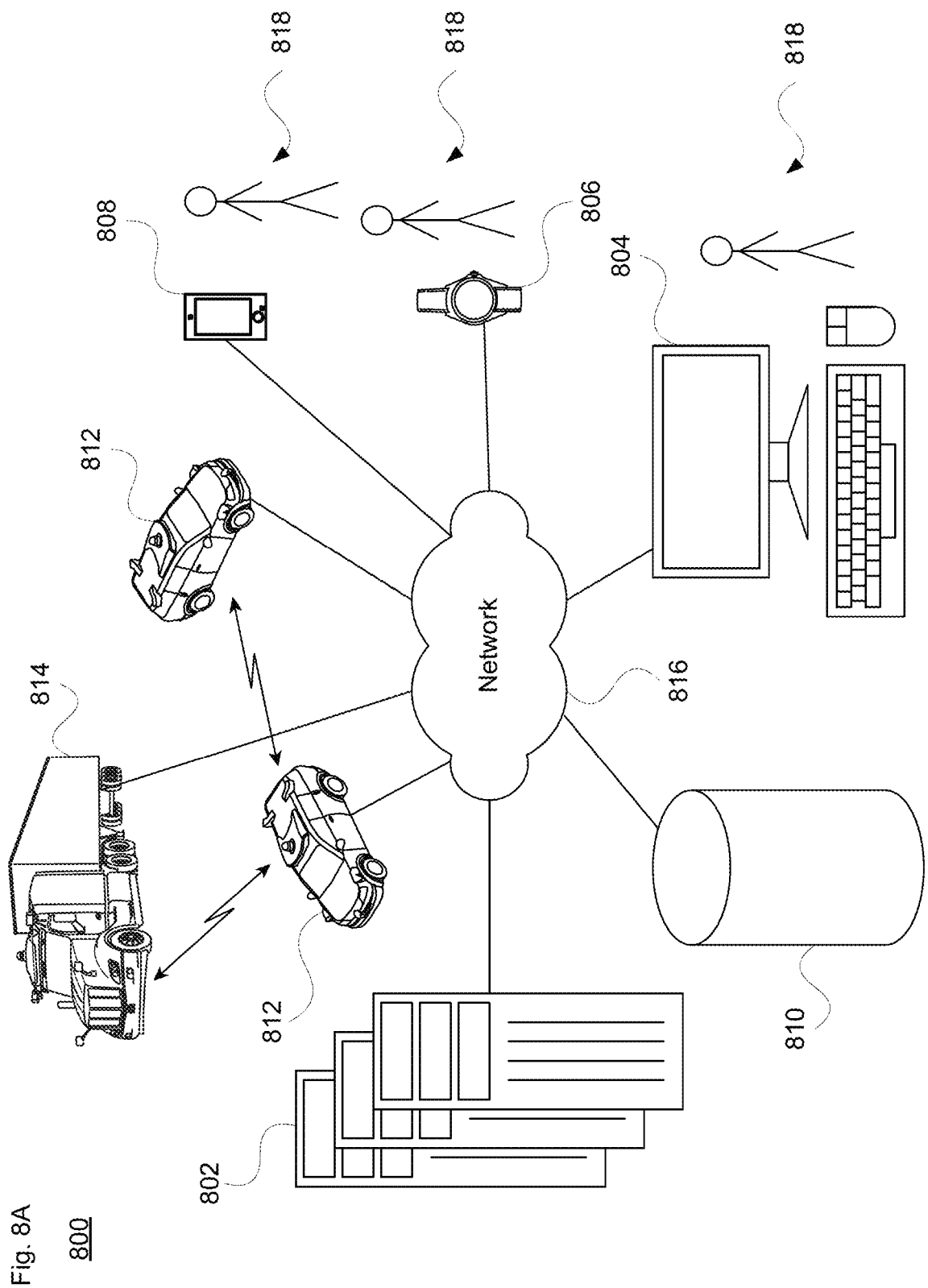
FIGS. 8A-B illustrate an example system in accordance with aspects of the technology.
Figure 8B:
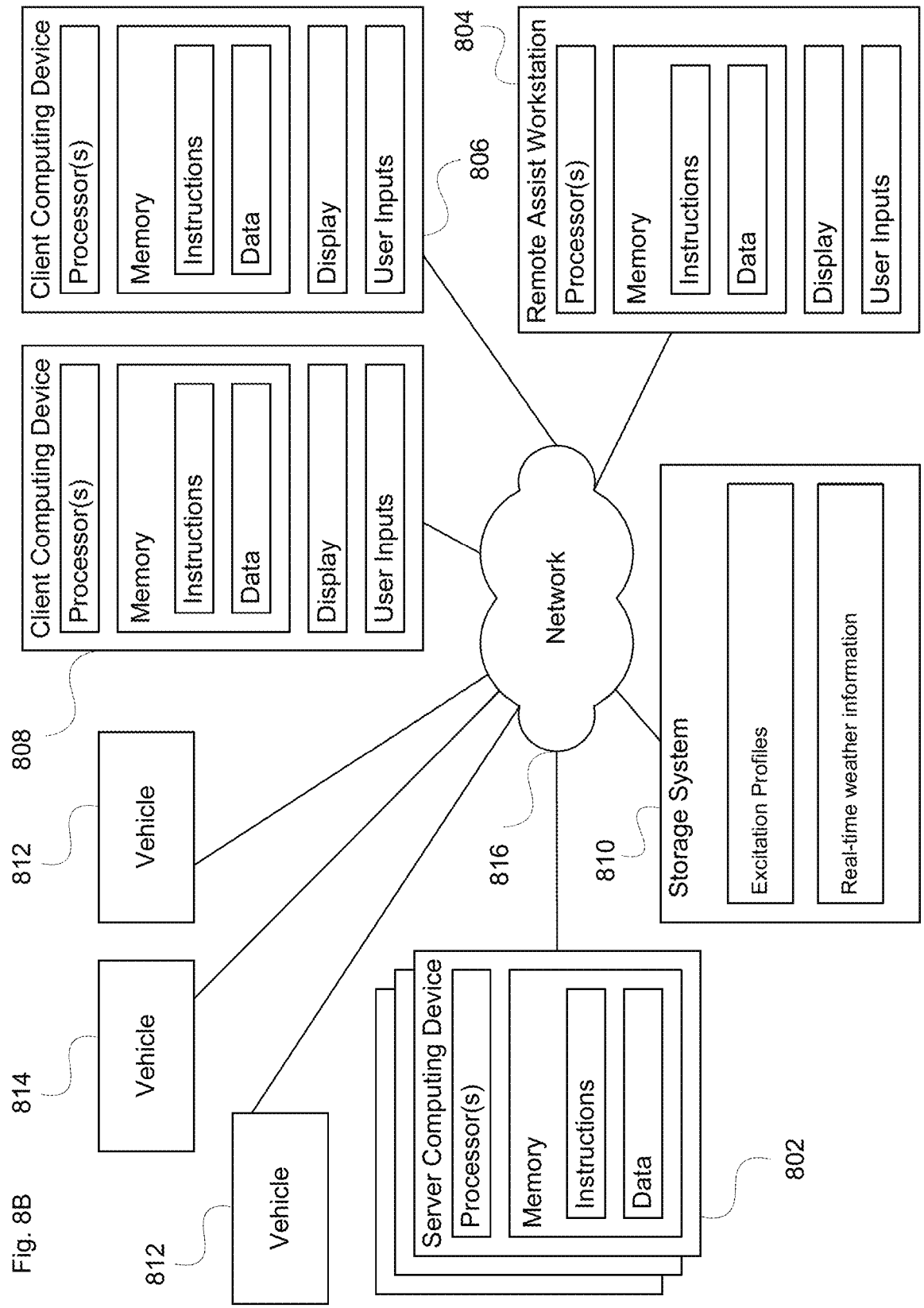

One example of a back-end system for fleet-type operation is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100, 120, 140 and/or 160 of FIGS. 1A-E. Vehicles 812 and/or vehicles 814 may be parts of one or more fleets of vehicles that provide rides for passengers or deliver meals, groceries, cargo or other packages to customers. Although only a few vehicles and computing devices are depicted for simplicity, a typical system may include significantly more, such as tens or hundreds of vehicles.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816 and any intervening nodes may include various configurations and protocols including short range communication protocols such as Bluetooth™, Bluetooth LET, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of autonomous vehicles that can be dispatched by a server computing device to various locations. In this regard, the computing device 802 may function as a dispatching server computing system which can be used to dispatch vehicles to different locations in order to pick up and drop off passengers or to pick up and deliver cargo or other items. In addition, server computing device 802 may use network 816 to transmit and present information to a user of one of the other computing devices or a rider in a vehicle. In this regard, computing devices 804, 806 and 808 may be considered client computing devices.

As shown in FIGS. 8A-B each client computing device 804, 806 and 808 may be a personal computing device intended for use by a respective user 818, and have all of the components normally used in connection with a personal computing device including a one or more processors (e.g., a central processing unit (CPU), graphics processing unit (GPU) and/or tensor processing unit (TPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for taking imagery and/or recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks.

In some examples, client computing device 804 may be a remote assistance workstation used by an administrator or operator to communicate with riders of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help address vehicle issues involving blocked steering actuators.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

Storage system 810 may store various types of information. For instance, the storage system 810 may store autonomous vehicle control software which is to be used by vehicles, such as vehicles 812 or 814, to operate such vehicles in an autonomous driving mode. Storage system 810 may also store one or more excitation profiles to be used to address blocked steering actuators for different vehicle types, different situations and/or different environmental conditions. The storage system 810 may also store real-time weather information (e.g., ambient temperature) that may be shared with specific vehicles or across the fleet as needed. Such information may be updated in real time, periodically, or off-line as additional weather information is obtained. The storage system 810 can also include route information. This information may be shared with the vehicles 812 and 814, for instance to help with operating the vehicles in an autonomous driving mode.

Figure 9:
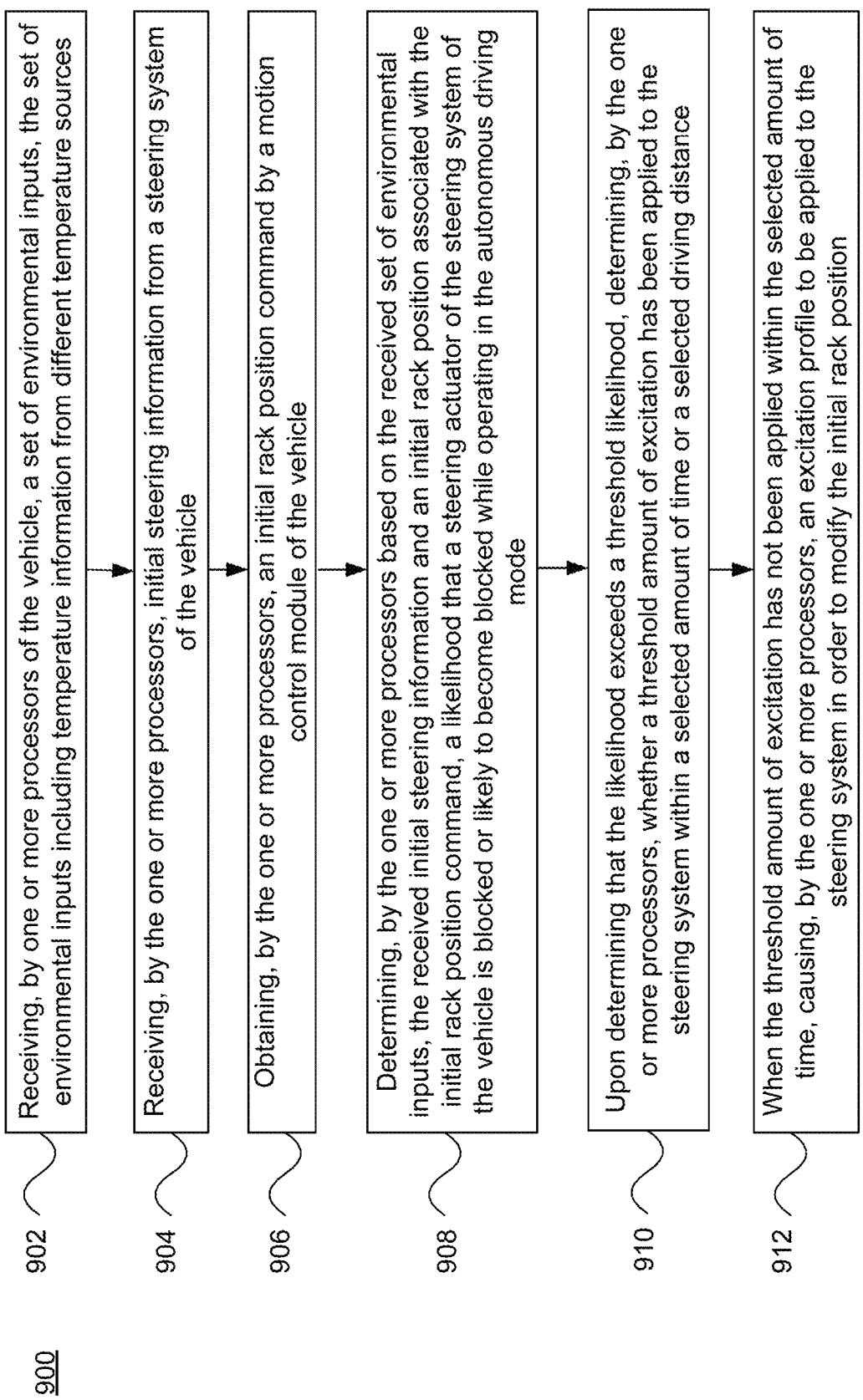
FIG. 9 illustrates an example method in accordance with aspects of the technology.

FIG. 9 illustrates a flow diagram 900 according to one aspect of the technology, which provides a method for controlling a vehicle configured to operate in an autonomous driving mode. At block 902 the method comprises receiving, by one or more processors of the vehicle, a set of environmental inputs, the set of environmental inputs including temperature information from different temperature sources. At block 904, the method includes receiving, by the one or more processors, initial steering information from a steering system of the vehicle. At block 906, the method includes obtaining, by the one or more processors, an initial rack position command by a motion control module of the vehicle. At block 908, the method includes determining, by the one or more processors based on the received set of environmental inputs, the received initial steering information and an initial rack position associated with the initial rack position command, a likelihood that a steering actuator of the steering system of the vehicle is blocked or likely to become blocked while operating in the autonomous driving mode. At block 910, upon determining that the likelihood exceeds a threshold likelihood, the method includes determining, by the one or more processors, whether a threshold amount of excitation has been applied to the steering system within a selected amount of time or a selected driving distance. And at block 912, when the threshold amount of excitation has not been applied (within the selected amount of time or the selected driving distance), the method includes causing, by the one or more processors, an excitation profile to be applied to the steering system in order to modify the initial rack position.

Figure 10:
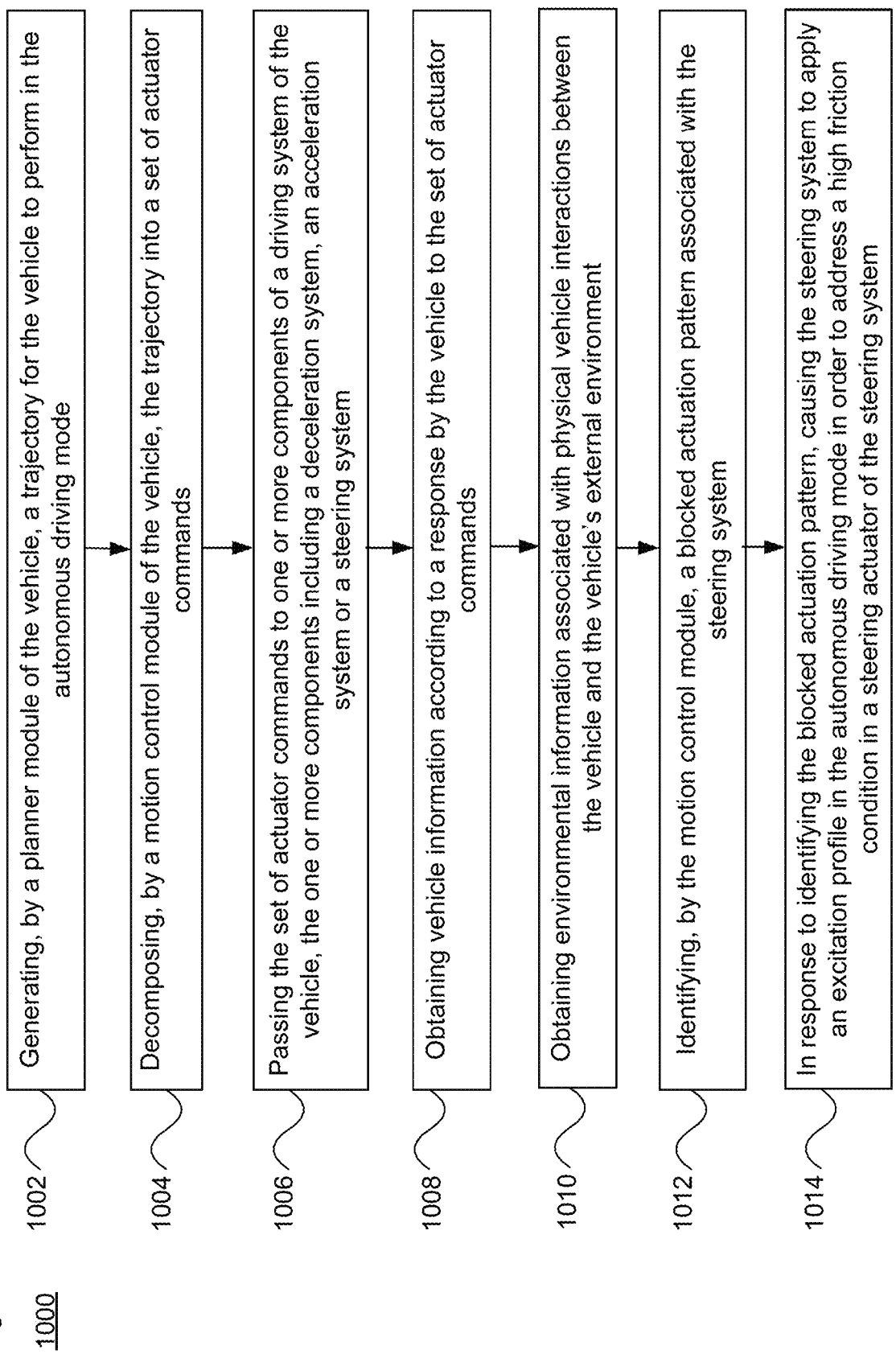
FIG. 10 illustrates another example method in accordance with aspects of the technology.

FIG. 10 illustrates a flow diagram 1000 according to one aspect of the technology, which provides a method for controlling a vehicle configured to operate in an autonomous driving mode. At block 1002, the method comprises generating, by a planner module of the vehicle, a trajectory for the vehicle to perform in the autonomous driving mode. At block 1004 the method includes decomposing, by a motion control module of the vehicle, the trajectory into a set of actuator commands. At block 1006, the method includes passing the set of actuator commands to one or more components of a driving system of the vehicle, the one or more components including a deceleration system, an acceleration system or a steering system. At block 1008, the method includes obtaining vehicle information according to a response by the vehicle to the set of actuator commands. At block 1010, the method includes obtaining environmental information associated with physical vehicle interactions between the vehicle and the vehicle's external environment. At block 1012, the method includes identifying, by the motion control module, a blocked actuation pattern associated with the steering system. And at block 1014, in response to identifying the blocked actuation pattern, the method includes causing the steering system to apply an excitation profile in the autonomous driving mode in order to address a high friction condition in a steering actuator of the steering system.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method for controlling a vehicle configured to operate in an autonomous driving mode, the method comprising:
receiving, by one or more processors of the vehicle, a set of environmental inputs, the set of environmental inputs including temperature information from different temperature sources;
receiving, by the one or more processors, initial steering information from a steering system of the vehicle;
obtaining, by the one or more processors, an initial rack position command by a motion control module of the vehicle;
determining, by the one or more processors based on the received set of environmental inputs, the received initial steering information and an initial rack position associated with the initial rack position command, a likelihood that a steering actuator of the steering system of the vehicle is blocked or likely to become blocked while operating in the autonomous driving mode;
upon determining that the likelihood exceeds a threshold likelihood, determining, by the one or more processors, whether a threshold amount of excitation has been applied to the steering system within a selected amount of time or a selected driving distance; and
when the threshold amount of excitation has not been applied, causing, by the one or more processors, an excitation profile to be applied to the steering system in order to modify the initial rack position.

2. The method of claim 1, further comprising:
in response to modification of the initial rack position, repeating (i) determining the likelihood that the steering actuator is blocked or likely to become blocked, and (ii) determining whether the threshold amount of excitation has been applied within the selected amount of time; and
causing another excitation profile to be applied to the steering system.

3. The method of claim 1, wherein receiving the set of environmental inputs including the temperature information from different temperature sources comprises receiving a set of temperature readings from different temperature sensors located at different parts of the vehicle.

4. The method of claim 3, wherein receiving the set of environmental inputs including the temperature information from different temperature sources further includes receiving local weather information obtained from another vehicle or obtained from a weather database.

5. The method of claim 3, wherein the different temperature sensors are a heterogenous set of sensors of different types.

6. The method of claim 3, wherein determining the likelihood that the steering actuator of the steering system of the vehicle is blocked or likely to become blocked includes comparing the temperature readings from the different temperature sensors to identify either an average temperature or an estimated temperature along the steering actuator.

7. The method of claim 1, wherein the received initial steering information includes at least one of a (i) current torque or a (ii) system effort versus rack position.

8. The method of claim 1, further comprising generating a future trajectory for the vehicle in response to a current trajectory that is based on the modified rack position.

9. The method of claim 1, wherein determining the likelihood that the steering actuator of the steering system of the vehicle is blocked or likely to become blocked includes identifying a blocked actuation pattern.

10. A vehicle configured to operate in an autonomous driving mode, the vehicle comprising:
a sensor system including one or more sensors, the one or more sensors being configured to obtain sensor data associated with objects in an external environment of the vehicle;
a driving system including a steering system, an acceleration system and a deceleration system to control driving of the vehicle; and
a control system including one or more processors, the control system operatively coupled to the driving system and the sensor system, the control system being configured to:
receive, from the sensor system a set of environmental inputs, the set of environmental inputs including temperature information from different temperature sources;
receive initial steering information from the steering system;
issue an initial rack position command to the steering system;

determine, based on the received set of environmental inputs, the received initial steering information and an initial rack position associated with the initial rack position command, a likelihood that a steering actuator of the steering system of the vehicle is blocked or likely to become blocked while operating in the autonomous driving mode;

upon determination that the likelihood exceeds a threshold likelihood, determine whether a threshold amount of excitation has been applied to the steering system within a selected amount of time or a selected driving distance; and when the threshold amount of excitation has not been applied within the selected amount of time, cause an excitation profile to be applied to the steering system in order to modify the initial rack position.

11. The vehicle of claim 10, wherein the determination of the likelihood that the steering actuator of the steering system of the vehicle is blocked or likely to become blocked includes the control system comparing temperature readings from different temperature sensors to identify either an average temperature or an estimated temperature along the steering actuator.

12. The vehicle of claim 10, wherein the determination of the likelihood that the steering actuator of the steering system of the vehicle is blocked or likely to become blocked includes identification of a blocked actuation pattern.

13. The vehicle of claim 12, wherein identification of the blocked actuation pattern is performed using a runtime diagnostic that observes a relationship between rotor speed and delivered motor torque for the driving system.

14. The vehicle of claim 12, wherein the blocked actuation pattern is a sticking movement pattern.

15. The vehicle of claim 10, wherein the control system is configured to generate a future trajectory for the vehicle in response to a current trajectory that is based on the modified rack position.

* * * * *